US012739482B2

(12) United States Patent
Bateman

(10) Patent No.: US 12,739,482 B2
(45) **Date of Patent: *Sep. 15, 2026**

(54) CONTENT PLAYBACK REMINDERS

(71) Applicant: Sonos, Inc., Goleta, CA (US)

(72) Inventor: Dayna Bateman, Springfield, IL (US)

(73) Assignee: Sonos, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/886,273

(22) Filed: Sep. 16, 2024

(65) Prior Publication Data

US 2025/0088720 A1 Mar. 13, 2025

Related U.S. Application Data

(63) Continuation of application No. 18/342,683, filed on Jun. 27, 2023, now Pat. No. 12,096,098, which is a continuation of application No. 17/737,759, filed on May 5, 2022, now Pat. No. 11,700,436.

(60) Provisional application No. 63/184,741, filed on May 5, 2021.

(51) Int. Cl.

| | |
|---|---|
| ***H04N 21/858*** | (2011.01) |
| ***G06F 16/955*** | (2019.01) |
| ***H04N 21/2187*** | (2011.01) |
| ***H04W 4/12*** | (2009.01) |

(52) U.S. Cl.
CPC ....... *H04N 21/8586* (2013.01); *G06F 16/955* (2019.01); *H04N 21/2187* (2013.01); *H04W 4/12* (2013.01)

(58) Field of Classification Search
CPC ........... H04N 21/8586; H04N 21/2187; H04N 21/43076; H04N 21/43615; H04N 21/8113; H04W 4/12; G06F 16/955
See application file for complete search history.

(56) References Cited

U.S. PATENT DOCUMENTS

| | | | | |
|---|---|---|---|---|
| 2011/0276372 | A1* | 11/2011 | Spivack | G06Q 10/109 705/14.5 |
| 2013/0073686 | A1* | 3/2013 | Sandholm | G06F 16/9537 709/219 |
| 2016/0007052 | A1* | 1/2016 | Haitsuka | H04N 21/2407 725/115 |
| 2017/0064400 | A1* | 3/2017 | Riegel | H04N 21/2743 |
| 2020/0267437 | A1* | 8/2020 | Pantos | H04N 21/8456 |

* cited by examiner

*Primary Examiner* — Benjamin M Thieu

(57) ABSTRACT

An example computing device is configured to determine (i) a future start time of an upcoming live media event and (ii) a uniform resource indicator (URI) at which a live media stream of the live media event will be accessible at the future start time. The computing device displays, via the graphical user interface, a notification identifying the upcoming live media event, and the computing device receives, via the graphical user interface, (i) a first selection of the displayed notification and (ii) a second selection of a plurality of playback devices of a media playback system. Based on the first and second selections, the computing device causes, at the start time of the live media event, at least one of the plurality of playback devices to access the live media stream at the URI for synchronous playback by the plurality of playback devices.

20 Claims, 12 Drawing Sheets

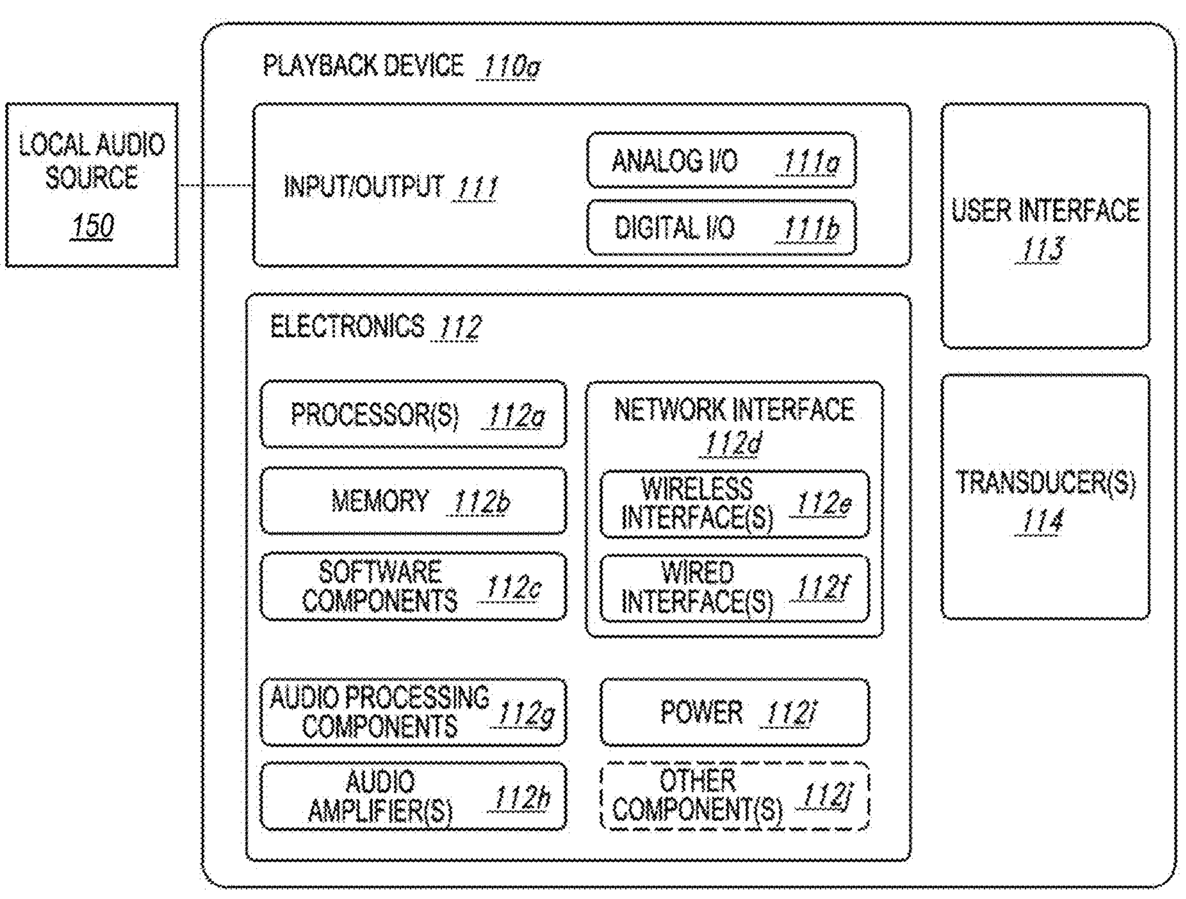
Figure 1C
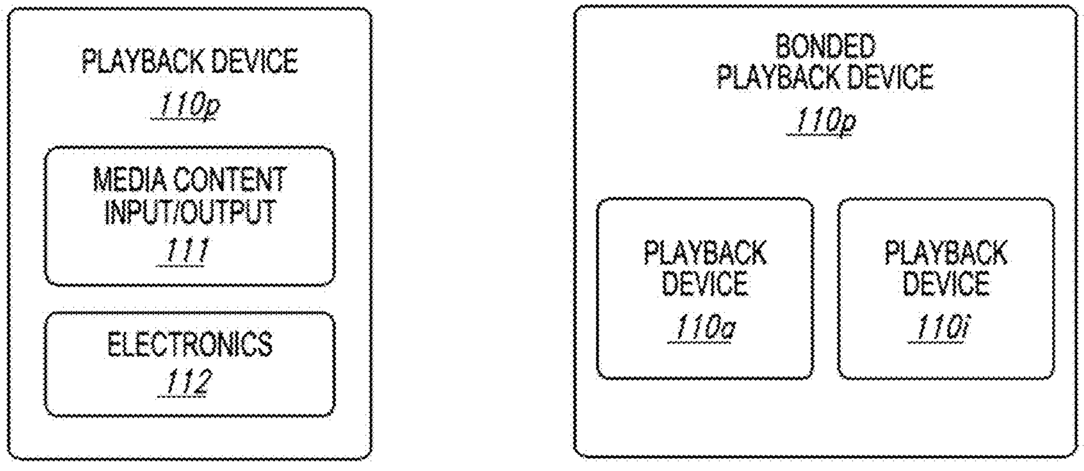
Figure 1D
Figure 1E

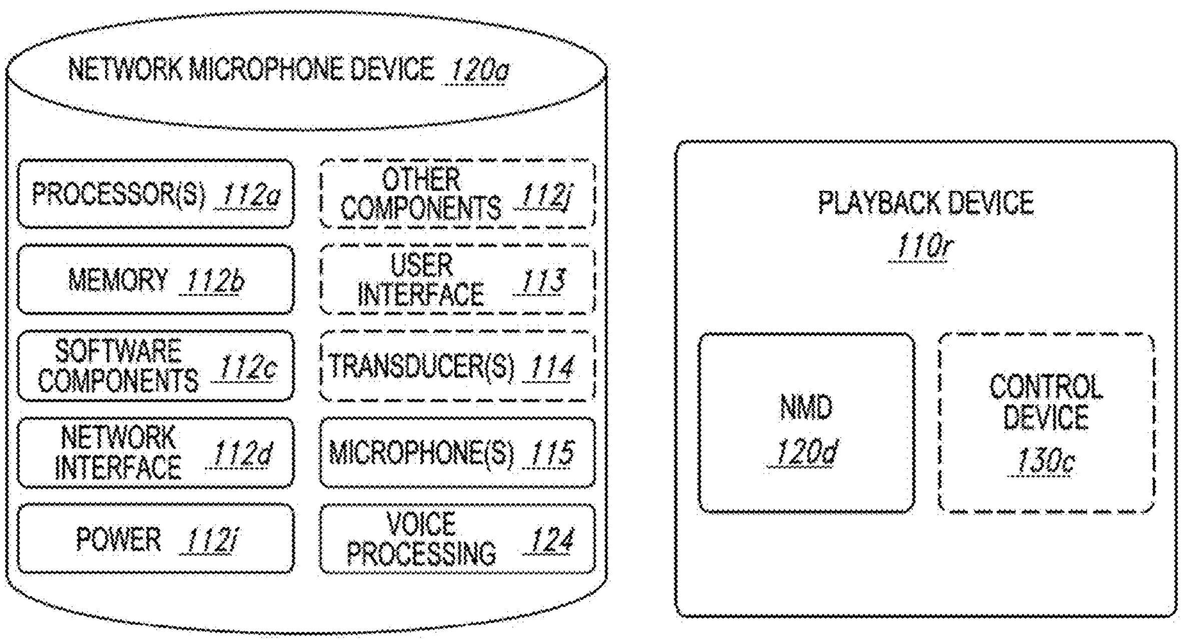
Figure 1F
Figure 1G
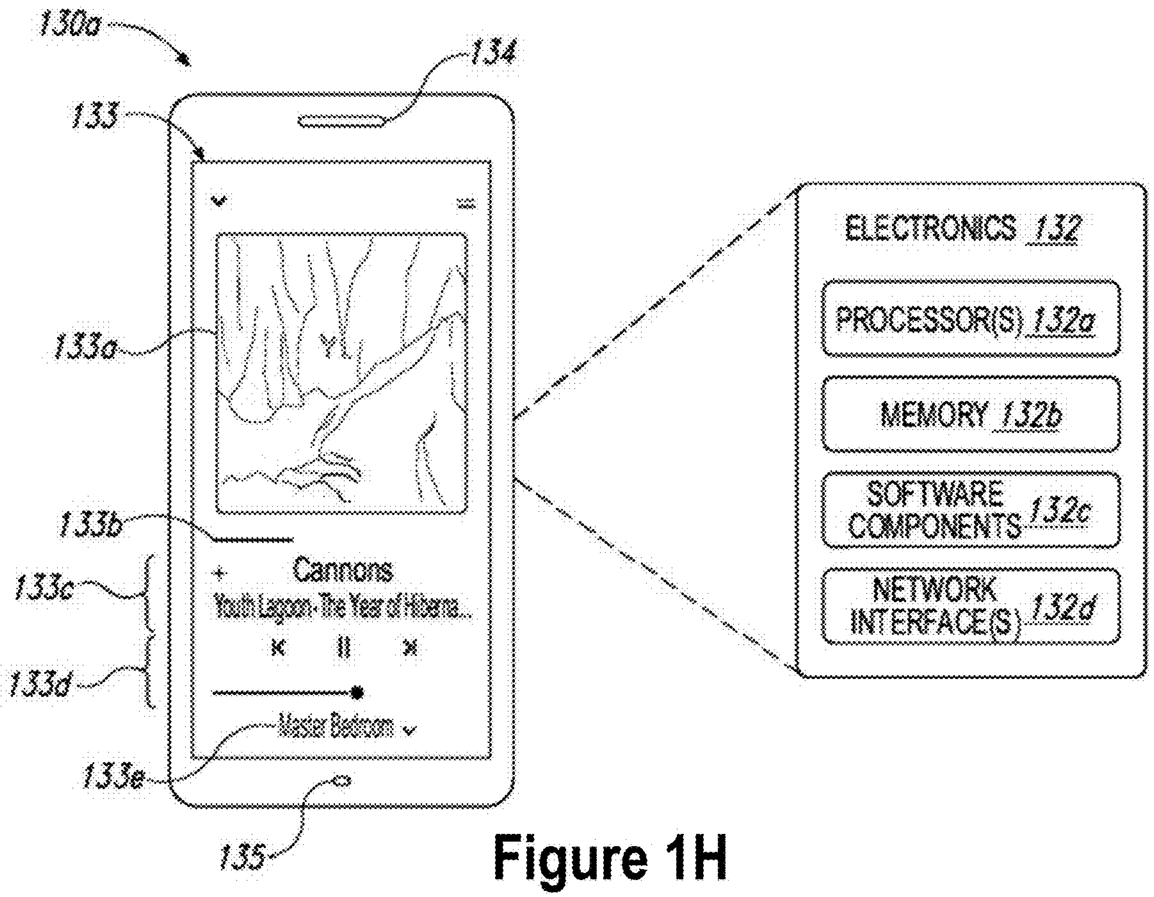
Figure 1H

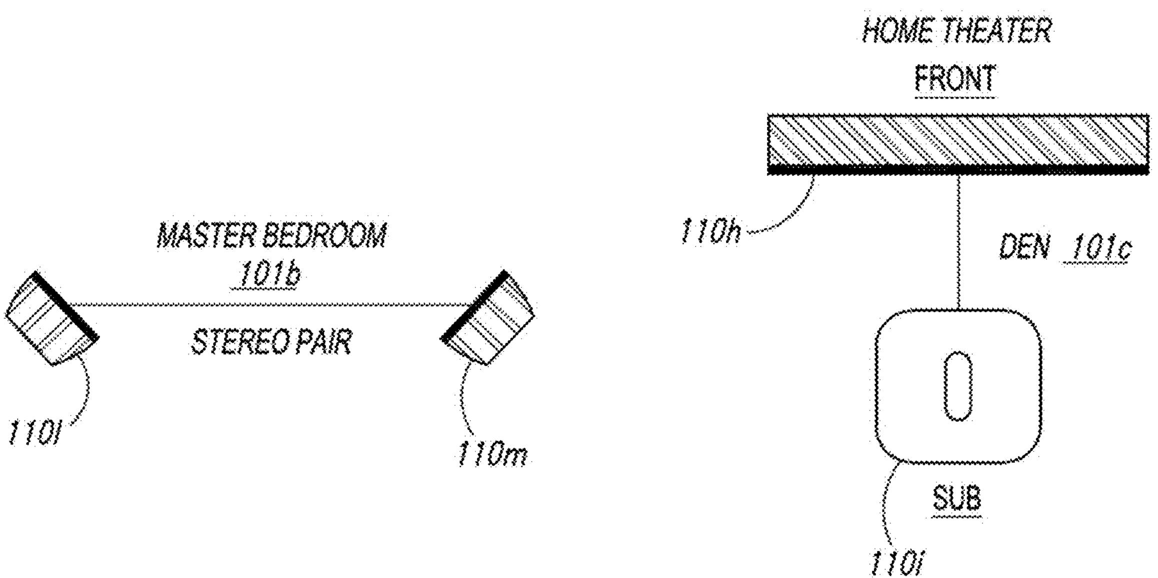
Figure 1J
Figure 1K
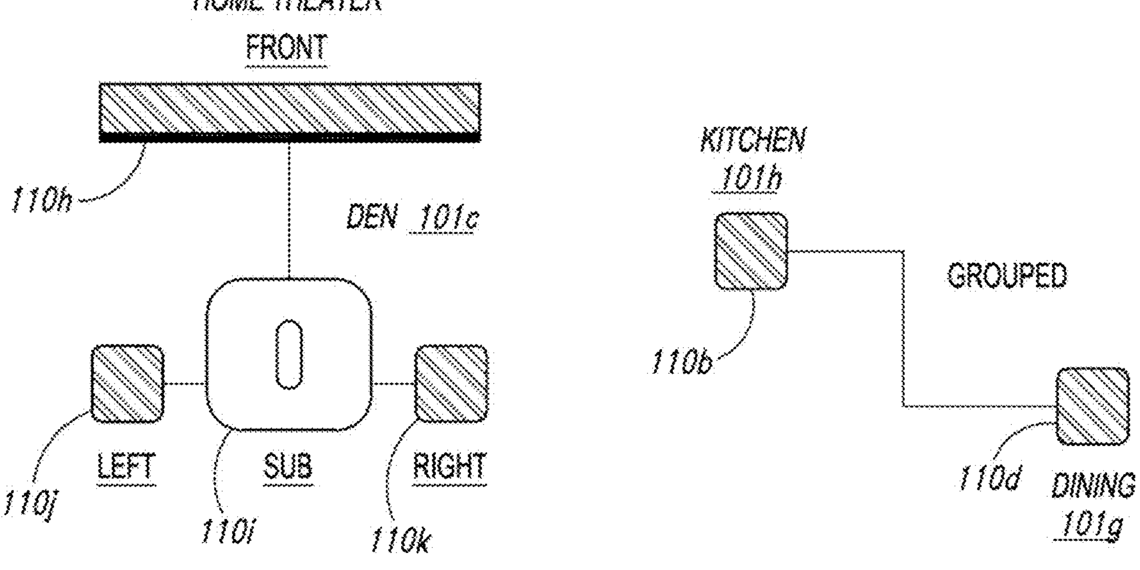
Figure 1L
Figure 1M

CONTENT PLAYBACK REMINDERS

CROSS-REFERENCE TO RELATED APPLICATION

This application claims priority to and is a continuation of U.S. application Ser. No. 18/342,683 filed Jun. 27, 2023, which is a continuation of U.S. application Ser. No. 17/737,759 filed May 5, 2022, which claims the benefit of priority under 35 U.S.C. § 119 to U.S. Provisional Patent App. No. 63/184,741 filed on May 5, 2021. The foregoing applications are incorporated herein by reference in their entireties.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when Sonos, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1C is a block diagram of an example playback device.

FIG. 1D is a block diagram of an example playback device.

FIG. 1E is a block diagram of an example playback device.

FIG. 1F is a block diagram of an example network microphone device.

FIG. 1G is a block diagram of an example playback device.

FIG. 1H is a partially schematic diagram of an example control device.

FIGS. 1J through 1M are schematic diagrams of example corresponding media playback system zones.

Figure 1A:
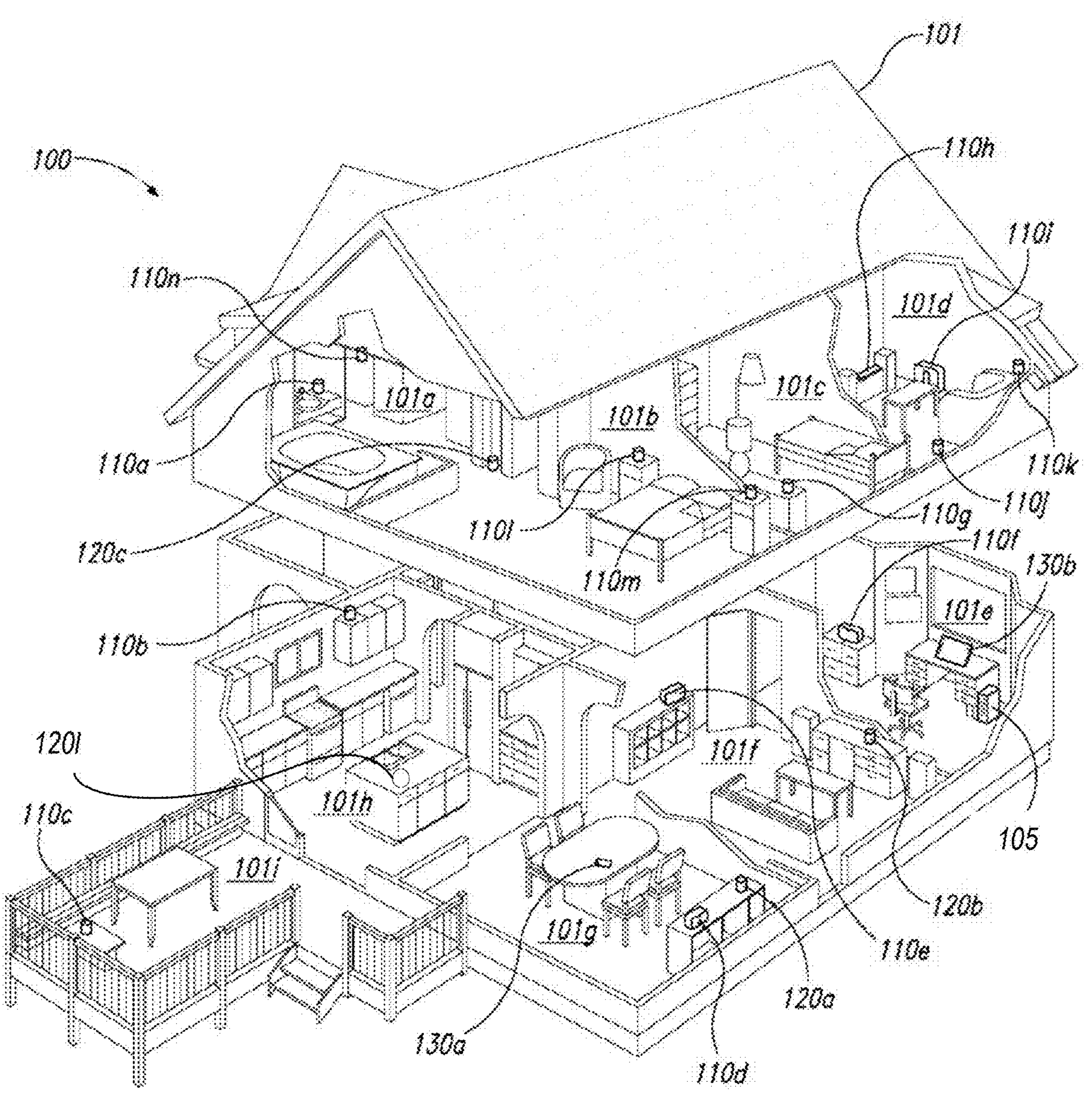
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments herein relate to enhanced experiences surrounding the playback of media content. An example media playback system includes a plurality of playback devices connected over a local network and configured to synchronously play back media content. A control device also connected to the local network may be configured to select media content for playback by the playback devices and control the playback of the media content by the playback devices. Example embodiments described herein involve using the control device to schedule the automatic playback of live media content streamed from a live media event.

In some embodiments, the techniques described herein may be implemented in a computing device that includes at least one processor, a graphical user interface, a non-transitory computer-readable medium, and program instructions stored on the non-transitory computer-readable medium that are executable by the at least one processor such that the computing device is configured to (i) determine (a) a future start time of an upcoming live media event and (b) a uniform resource indicator (URI) at which a live media stream of the live media event will be accessible at the future start time; (ii) display, via the graphical user interface, a notification identifying the upcoming live media event; (iii) receive, via the graphical user interface, (a) a first selection of the displayed notification and (b) a second selection of a plurality of playback devices of a media playback system; and (iv) based on the first and second selections, cause, at the start time of the live media event, at least one of the plurality of playback devices to access the live media stream at the URI for synchronous playback by the plurality of playback devices.

In another aspect, a non-transitory computer-readable medium is provided. The non-transitory computer-readable medium is provisioned with program instructions that, when executed by at least one processor, cause a computing device to (i) determine (a) a future start time of an upcoming live media event and (b) a uniform resource indicator (URI) at which a live media stream of the live media event will be accessible at the future start time; (ii) display, via a graphical user interface of the computing device, a notification identifying the upcoming live media event; (iii) receive, via the graphical user interface of the computing device, (a) a first selection of the displayed notification and (b) a second selection of a plurality of playback devices of a media playback system; and (iv) based on the first and second selections, cause, at the start time of the live media event, at least one of the plurality of playback devices to access the live media stream at the URI for synchronous playback by the plurality of playback devices.

In yet another aspect, a method carried out by a computing device includes (i) determining (a) a future start time of an upcoming live media event and (b) a uniform resource indicator (URI) at which a live media stream of the live media event will be accessible at the future start time; (ii) displaying, via a graphical user interface of the computing device, a notification identifying the upcoming live media event; (iii) receiving, via the graphical user interface of the computing device, (a) a first selection of the displayed notification and (b) a second selection of a plurality of playback devices of a media playback system; and (iv) based on the first and second selections, causing, at the start time of the live media event, at least one of the plurality of playback devices to access the live media stream at the URI for synchronous playback by the plurality of playback devices.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

II. Suitable Operating Environment a. Suitable Media Playback System

Figure 1B:
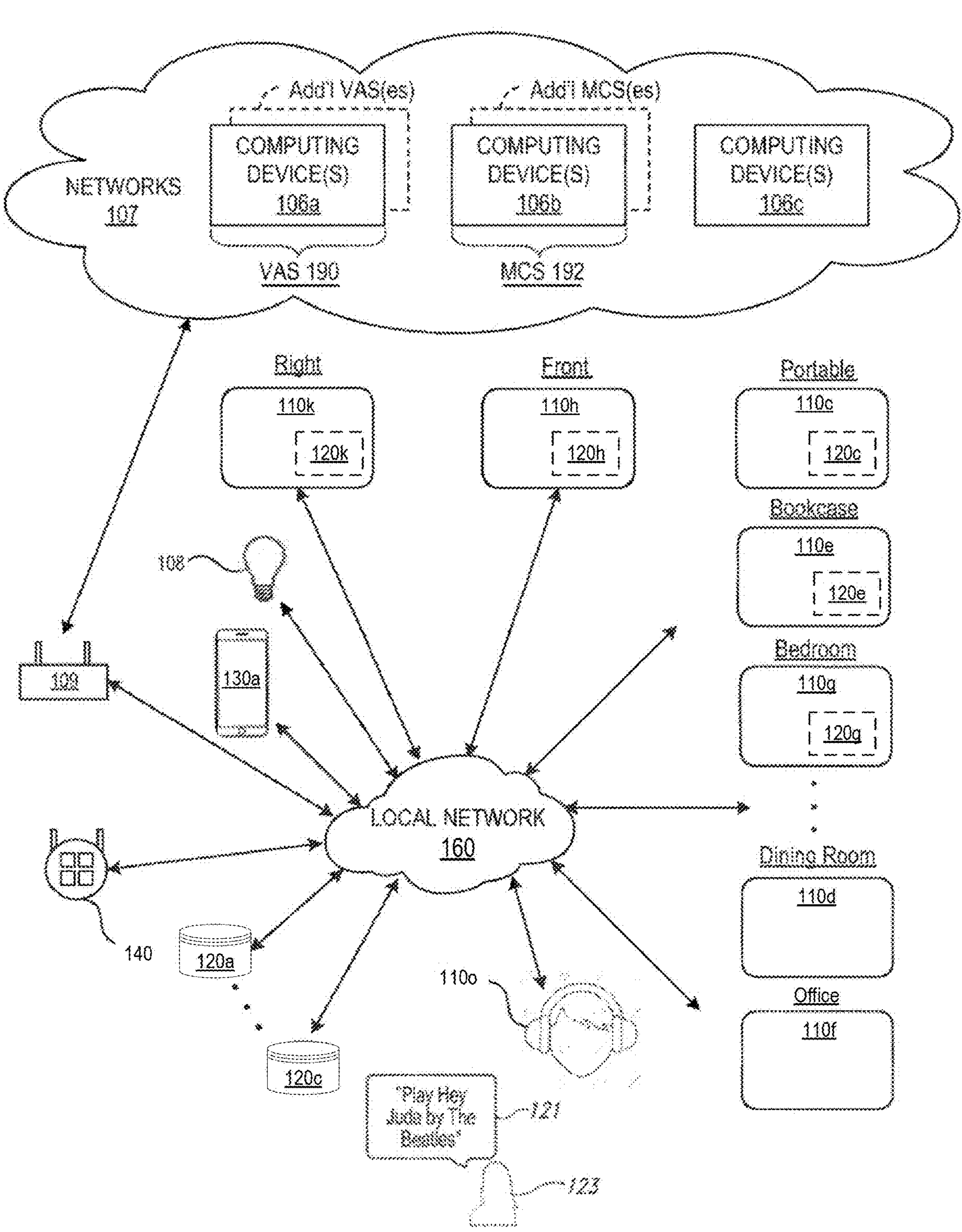
FIG. 1B is a schematic diagram of the media playback system of FIG. 1A and one or more networks.

FIGS. 1A and 1B illustrate an example configuration of a media playback system ("MPS") 100 in which one or more embodiments disclosed herein may be implemented. Referring first to FIG. 1A, a partial cutaway view of MPS 100 distributed in an environment 101 (e.g., a house) is shown. The MPS 100 as shown is associated with an example home environment having a plurality of rooms and spaces, although other types of environments (e.g., a commercial environment) are also possible, as discussed in further examples below. The MPS 100 comprises one or more playback devices 110 (identified individually as playback devices 110*a-o*), one or more network microphone devices ("NMDs") 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the MPS 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the MPS 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the MPS 100 is configured to play back audio from a first playback device (e.g., the playback device 110*a*) in synchrony with a second playback device (e.g., the playback device 110*b*). Interactions between the playback devices 110, NMDs 120, and/or control devices 130 of the MPS 100 configured in accordance with the various embodiments of the disclosure are described in greater detail below with respect to FIGS. 1B-1H.

In the illustrated embodiment of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), as described in further detail below with respect to FIGS. 5A-5B. In further embodiments, the MPS 100 may be implemented in one or more vehicles (e.g., a sports utility vehicle, bus, car, a ship, a boat, an airplane), multiple environments (e.g., a combination of home, commercial, and vehicle environments), and/or another suitable environment where multi-zone audio may be desirable.

The MPS 100 can comprise one or more playback zones, some of which may correspond to the rooms in the environment 101. The MPS 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the balcony 101*i*. In some aspects, a single playback zone may include multiple rooms or spaces. In certain aspects, a single room or space may include multiple playback zones.

In the illustrated embodiment of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices.

Referring to FIG. 1B, the home environment may include additional and/or other computing devices, including local network devices, such as one or more smart illumination devices 108 (FIG. 1B), a smart thermostat 140, and a local computing device 105 (FIG. 1A). In embodiments described below, one or more of the various playback devices 110 may be configured as portable playback devices, while others may be configured as stationary playback devices. For example, the headphones 1100 (FIG. 1B) are a portable playback device, while the playback device 110*e* on the bookcase may be a stationary device. As another example, the playback device 110*c* on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices and/or other network devices of the MPS 100 may be coupled to one another via point-to-point connections and/or over other connections, which may be wired and/or wireless, via a local network 160 that may include a network router 109. For example, the playback device 110*j* in the Den 101*d* (FIG. 1A), which may be designated as the "Left" device, may have a point-to-point connection with the playback device 110*k*, which is also in the Den 101*d* and may be designated as the "Right" device. In a related embodiment, the Left playback device 110*j* may communicate with other network devices, such as the playback device 110*h*, which may be designated as the "Front" device, via a point-to-point connection and/or other connections via the local network 160.

The local network 160 may be, for example, a network that interconnects one or more devices within a limited area (e.g., a residence, an office building, a restaurant, a retail store, a car, an individual's workspace, etc.). The local network 160 may include, for example, one or more local area networks (LANs) such as a wireless local area network (WLAN) (e.g., a Wi-Fi network, a Z-Wave network, etc.) and/or one or more personal area networks (PANs) (e.g. a Bluetooth network, a wireless USB network, a ZigBee network, an IRDA network, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "Wi-Fi" can refer to several different communication protocols including, for example, Institute of Electrical and Electronics Engineers (IEEE) 802.11a, 802.11b, 802.11g, 802.12, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHZ, and/or another suitable frequency.

The MPS 100 is configured to receive media content from the local network 160. The received media content can comprise, for example, a Uniform Resource Identifier (URI) and/or a Uniform Resource Locator (URL). For instance, in some examples, the MPS 100 can stream, download, or otherwise obtain data from a URI or a URL corresponding to the received media content.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the environment 101 (FIG. 1A).

In some implementations, the various playback devices 110, NMDs 120, and/or control devices 130 may be communicatively coupled to at least one remote computing device associated with a voice assistant service ("VAS") and/or at least one remote computing device associated with a media content service ("MCS"). For instance, in the illustrated example of FIG. 1B, remote computing devices 106*a* are associated with a VAS 190 and remote computing devices 106*b* are associated with an MCS 192. Although only a single VAS 190 and a single MCS 192 are shown in the example of FIG. 1B for purposes of clarity, the MPS 100 may be coupled to multiple, different VASes and/or MCSes. In some embodiments, the various playback devices 110, NMDs 120, and/or control devices 130 may transmit data associated with a received voice input to a VAS configured to (i) process the received voice input data and (ii) transmit a corresponding command to the MPS 100. In some aspects, for example, the computing devices 106*a* may comprise one or more modules and/or servers of a VAS. In some implementations, VASes may be operated by one or more of SONOS, AMAZON, GOOGLE, APPLE, MICROSOFT, NUANCE, or other voice assistant providers. In some implementations, MCSes may be operated by one or more of SONOS, SPOTIFY, PANDORA, AMAZON MUSIC, YOUTUBE MUSIC, APPLE MUSIC, or other media content services.

In some embodiments, the local network 160 comprises a dedicated communication network that the MPS 100 uses to transmit messages between individual devices and/or to transmit media content to and from MCSes. In certain embodiments, the local network 160 is configured to be accessible only to devices in the MPS 100, thereby reducing interference and competition with other devices in the environment 101. In other embodiments, however, the local network 160 comprises an existing household communication network (e.g., a household Wi-Fi network). In some embodiments, the MPS 100 is implemented without the local network 160, and the various devices comprising the MPS 100 can communicate with each other, for example, via one or more direct connections, PANs, telecommunication networks (e.g., an LTE network or a 5G network, etc.), and/or other suitable communication links.

In some embodiments, audio content sources may be regularly added or removed from the MPS 100. In some embodiments, for example, the MPS 100 performs an indexing of media items when one or more media content sources are updated, added to, and/or removed from the MPS 100. The MPS 100 can scan identifiable media items in some or all folders and/or directories accessible to the various playback devices and generate or update a media content database comprising metadata (e.g., title, artist, album, track length) and other associated information (e.g., URIs, URLs) for each identifiable media item found. In some embodiments, for example, the media content database is stored on one or more of the various playback devices, network microphone devices, and/or control devices of MPS 100.

As further shown in FIG. 1B, the remote computing devices 106 further include remote computing device 106*c* configured to perform certain operations, such as remotely facilitating media playback functions, managing device and system status information, directing communications between the devices of the MPS 100 and one or multiple VASes and/or MCSes, among other operations. In one example, the remote computing devices 106*c* provide cloud servers for one or more SONOS Wireless HiFi Systems.

In various implementations, one or more of the playback devices 110 may take the form of or include an on-board (e.g., integrated) network microphone device configured to receive voice utterances from a user. For example, the playback devices 110*c*-110*h*, and 110*k* include or are otherwise equipped with corresponding NMDs 120*c*-120*h*, and 120*k*, respectively. A playback device that includes or is equipped with an NMD may be referred to herein interchangeably as a playback device or an NMD unless indicated otherwise in the description. In some cases, one or more of the NMDs 120 may be a stand-alone device. For example, the NMD 1201 may be a stand-alone device. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 110 and 120 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 110*e* because it is physically situated on a bookcase. Similarly, the NMD 1201 may be assigned the named "Island" because it is physically situated on an island countertop in the Kitchen 101*h* (FIG. 1A). Some playback devices may be assigned names according to a zone or room, such as the playback devices 110*g*, 110*d*, and 110*f*, which are named "Bedroom," "Dining Room," and "Office," respectively. Further, certain playback devices may have functionally descriptive names. For example, the playback devices 110*k* and 110*h* are assigned the names "Right" and "Front," respectively, because these two devices are configured to provide specific audio channels during media playback in the zone of the Den 101*d* (FIG. 1A). The playback device 110*c* in the Patio may be named "Portable" because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 120 are configured to interact with the VAS 190 over the local network 160 and/or the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 105, 110, 120, and 130 (FIG. 1A) and/or remote computing devices 106*c* of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the MPS 100 may exchange data via communication paths as described herein and/or using a metadata exchange channel as described in U.S. Patent Publication No. 2017-0242653 published Aug. 24, 2017, and titled "Voice Control of a Media Playback System," which is herein incorporated by reference in its entirety.

Upon receiving the stream of sound data, the VAS 190 may determine if there is voice input in the streamed data from the NMD, and if so the VAS 190 may also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the NIPS 100 or indirectly via the VAS 190. In some implementations, the VAS 190 may transmit to the NIPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 110*e* in the environment 101 (FIG. 1A) is in relatively close proximity to the NMD-equipped Living Room playback device 120*b*, and both devices 110*e* and 120*b* may at least sometimes detect the same sound. In such cases, this may require arbitration as to which device is ultimately responsible for providing detected-sound data to the remote VAS. Examples of arbitrating between NMDs may be found, for example, in previously referenced U.S. Patent Publication No. 2017-0242653.

In certain implementations, an NMD may be assigned to, or otherwise associated with, a designated or default playback device that may not include an NMD. For example, the Island NMD 1201 in the Kitchen 101*h* (FIG. 1A) may be assigned to the Dining Room playback device 110*d*, which is in relatively close proximity to the Island NMD 1201. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. Patent Publication No. 2017-0242653.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback devices 110, network microphone devices 120, and/or control devices 130. For example, the technologies herein may be utilized within an environment having a single playback device 110 and/or a single NMD 120. In some examples of such cases, the local network 160 (FIG. 1B) may be eliminated and the single playback device 110 and/or the single NMD 120 may communicate directly with the remote computing devices 106*a-c*. In some embodiments, a telecommunication network (e.g., an LTE network, a 5G network, etc.) may communicate with the various playback devices 110, network microphone devices 120, and/or control devices 130 independent of the local network 160.

b. Suitable Playback Devices

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises a High-Definition Multimedia Interface (HDMI) interface and/or cable. In some embodiments, the digital I/O 111*b* includes one or more wireless communication links comprising, for example, a radio frequency (RF), infrared, Wi-Fi, Bluetooth, or another suitable communication protocol. In certain embodiments, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 150 via the input/output 111 (e.g., a cable, a wire, a PAN, a Bluetooth connection, an ad hoc wired or wireless communication network, and/or another suitable communication link). The local audio source 150 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 150 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 150. In other embodiments, however, the media playback system omits the local audio source 150 altogether. In some embodiments, the playback device 110*a* does not include an input/output 111 and receives all audio content via the local network 160.

The playback device 110*a* further comprises electronics 112, a user interface 113 (e.g., one or more buttons, knobs, dials, touch-sensitive surfaces, displays, touchscreens), and one or more transducers 114 (e.g., a driver), referred to hereinafter as "the transducers 114." The electronics 112 is configured to receive audio from an audio source (e.g., the local audio source 150) via the input/output 111, one or more of the computing devices 106*a-c* via the local network 160 (FIG. 1B)), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as "the microphones 115"). In certain embodiments, for example, the playback device 110*a* having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power components 112*i* (e.g., one or more power supplies, power cables, power receptacles, batteries, induction coils, Power-over Ethernet (POE) interfaces, and/or other suitable sources of electric power).

In some embodiments, the electronics 112 optionally include one or more other components 112*j* (e.g., one or more sensors, video displays, touchscreens, battery charging bases). In some embodiments, the playback device 110*a* and electronics 112 may further include one or more voice processing components that are operable coupled to one or more microphones, and other components as described below with reference to FIGS. 1F and 1G.

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some embodiments, the operations further include causing the playback device 110*a* to send audio data to another one of the playback devices 110*a* and/or another device (e.g., one of the NMDs 120). Certain embodiments include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395 entitled "System and Method for Synchronizing Operations Among a Plurality of Independently Clocked Digital Data Processing Devices," which is incorporated by reference herein in its entirety.

In some embodiments, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the MPS 100. In some aspects, for example, the state data is shared during predetermined intervals of time (e.g., every 5 seconds, every 10 seconds, every 60 seconds) among at least a portion of the devices of the MPS 100, so that one or more of the devices have the most recent data associated with the MPS 100.

The network interface 112*d* is configured to facilitate a transmission of data between the playback device 110*a* and one or more other devices on a data network. The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated embodiment of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the local network 160 (FIG. 1B) in accordance with a suitable wireless communication protocol (e.g., Wi-Fi, Bluetooth, LTE). In some embodiments, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omits the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h*.

In some implementations, the power components 112*i* of the playback device 110*a* may additionally include an internal power source (e.g., one or more batteries) configured to power the playback device 110*a* without a physical connection to an external power source. When equipped with the internal power source, the playback device 110*a* may operate independent of an external power source. In some such implementations, an external power source interface may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The user interface 113 may facilitate user interactions independent of or in conjunction with user interactions facilitated by one or more of the control devices 130 (FIG. 1A). In various embodiments, the user interface 113 includes one or more physical buttons and/or supports graphical interfaces provided on touch sensitive screen(s) and/or surface(s), among other possibilities, for a user to directly provide input. The user interface 113 may further include one or more of lights (e.g., LEDs) and the speakers to provide visual and/or audio feedback to a user.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, “low frequency” can generally refer to audible frequencies below about 500 Hz, “mid-range frequency” can generally refer to audible frequencies between about 500 Hz and about 2 kHz, and “high frequency” can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

In some embodiments, the playback device 110*a* may include a speaker interface for connecting the playback device to external speakers. In other embodiments, the playback device 110*a* may include an audio interface for connecting the playback device to an external audio amplifier or audio-visual receiver.

By way of illustration, SONOS, Inc. presently offers (or has offered) for sale certain playback devices including, for example, “SONOS ONE,” “SONOS ONE SL,” “SONOS FIVE,” “PLAY:1,” “PLAY:3,” “PLAY:5,” “PLAYBAR,” “PLAYBASE,” “BEAM,” “ARC,” “CONNECT:AMP,” “CONNECT,” “AMP,” “PORT,” “MOVE,” and “SUB,” as well as network devices including, for example “BOOST,” and “BRIDGE.” Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110*p* comprising the input/output 111 and electronics 112 without the user interface 113 or transducers 114.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with playback device 110*i*, is configured to render only the mid-range and high frequency components of a particular audio content, while the playback device 110*i* renders the low frequency component of the particular audio content. In some embodiments, the bonded playback device 110*q* includes additional playback devices and/or another bonded playback device.

Figure 4:
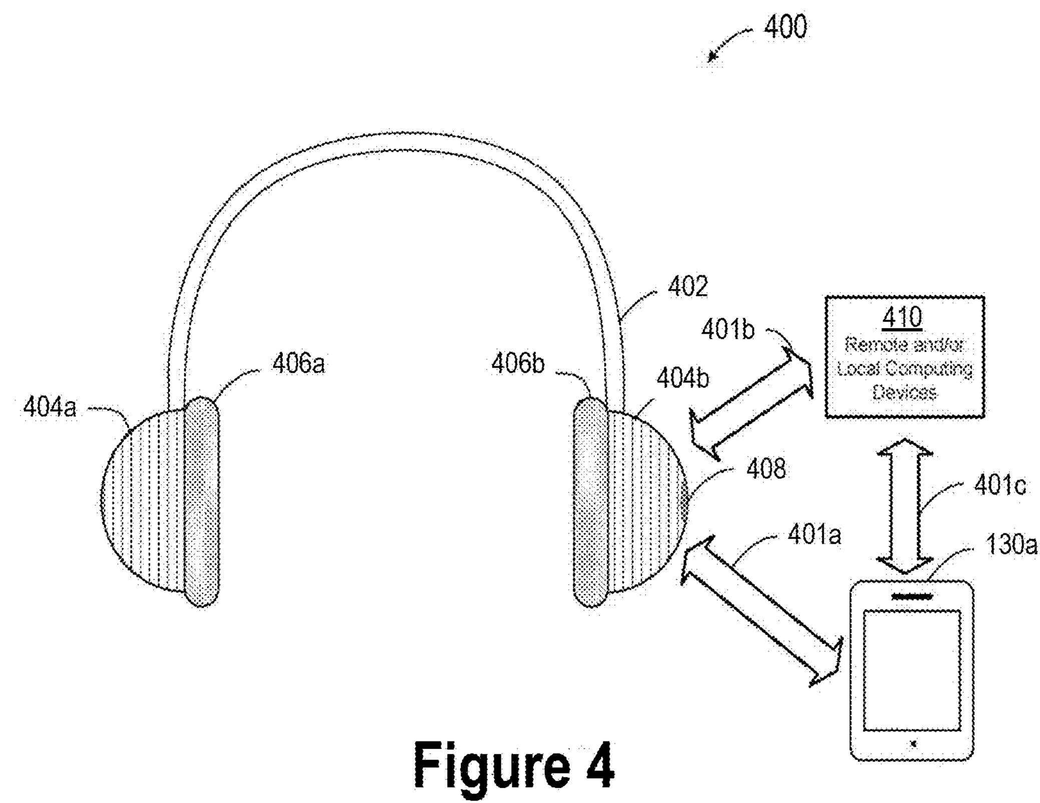
FIG. 4 is a diagram of an example headset assembly for the playback device of FIG. 3.

In some embodiments, one or more of the playback devices 110 may take the form of a wired and/or wireless headphone (e.g., an over-ear headset, an on-ear headset, or an in-ear headset). For instance, FIG. 4 shows an example headset assembly 400 (“headset 400”) for such an implementation of one of the playback devices 110. As shown, the headset 400 includes a headband 402 that couples a first earcup 404*a* to a second earcup 404*b*. Each of the earcups 404*a* and 0244*b* may house any portion of the electronic components in the playback device 110, such as one or more speakers. Further, one or more of the earcups 404*a* and 404*b* may include a user interface for controlling audio playback, volume level, and other functions. The user interface may include any of a variety of control elements such as a physical button 408, a slider, a knob, and/or a touch control surface. As shown in FIG. 4, the headset 400 may further include ear cushions 406*a* and 406*b* that are coupled to ear cups 404*a* and 404*b*, respectively. The ear cushions 406*a* and 406*b* may provide a soft barrier between the head of a user and the earcups 404*a* and 404*b*, respectively, to improve user comfort and/or provide acoustic isolation from the ambient (e.g., passive noise reduction (PNR)).

As described in greater detail below, the electronic components of a playback device may include one or more network interface components (not shown in FIG. 4) to facilitate wireless communication over one more communication links. For instance, a playback device may communicate over a first communication link 401*a* (e.g., a Bluetooth link) with one of the control devices 130 and/or over a second communication link 401*b* (e.g., a Wi-Fi or cellular link) with one or more other computing devices 410 (e.g., a network router and/or a remote server). As another possibility, a playback device may communicate over multiple communication links, such as the first communication link 401*a* with the control device 130*a* and a third communication link 401*c* (e.g., a Wi-Fi or cellular link) between the control device 130*a* and the one or more other computing devices 410. Thus, the control device 130*a* may function as an intermediary between the playback device and the one or more other computing devices 410, in some embodiments.

In some instances, the headphone device may take the form of a hearable device. Hearable devices may include those headphone devices (including ear-level devices) that are configured to provide a hearing enhancement function while also supporting playback of media content (e.g., streaming media content from a user device over a PAN, streaming media content from a streaming music service provider over a WLAN and/or a cellular network connection, etc.). In some instances, a hearable device may be implemented as an in-ear headphone device that is configured to playback an amplified version of at least some sounds detected from an external environment (e.g., all sound, select sounds such as human speech, etc.).

It should be appreciated that one or more of the playback devices 110 may take the form of other wearable devices separate and apart from a headphone. Wearable devices may include those devices configured to be worn about a portion of a subject (e.g., a head, a neck, a torso, an arm, a wrist, a finger, a leg, an ankle, etc.). For example, the playback devices 110 may take the form of a pair of glasses including a frame front (e.g., configured to hold one or more lenses), a first temple rotatably coupled to the frame front, and a second temple rotatable coupled to the frame front. In this example, the pair of glasses may comprise one or more transducers integrated into at least one of the first and second temples and configured to project sound towards an ear of the subject.

c. Suitable Network Microphone Devices (NMD) s

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio components 112*g* (FIG. 1C), the transducers 114, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing components 124, and only a portion of the components of the electronics 112 described above with respect to FIG. 1B. In some aspects, for example, the NMD 120*a* includes the processor 112*a* and the memory 112*b* (FIG. 1B), while omitting one or more other components of the electronics 112. In some embodiments, the NMD 120*a* includes additional components (e.g., one or more sensors, cameras, thermometers, barometers, hygrometers).

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing components 124 (FIG. 1F). The microphones 115 are configured to detect sound (i.e., acoustic waves) in the environment of the playback device 110*r*, which is then provided to voice processing components 124. More specifically, each microphone 115 is configured to detect sound and convert the sound into a digital or analog signal representative of the detected sound, which can then cause the voice processing component to perform various functions based on the detected sound, as described in greater detail below. In some implementations, the microphones 115 may be arranged as an array of microphones (e.g., an array of six microphones). In some implementations the playback device 110*r* may include fewer than six microphones or more than six microphones. The playback device 110*r* optionally includes an integrated control device 130*c*. The control device 130*c* can comprise, for example, a user interface configured to receive user input (e.g., touch input, voice input) without a separate control device. In other embodiments, however, the playback device 110*r* receives commands from another control device (e.g., the control device 130*a* of FIG. 1B).

In operation, the voice-processing components 124 are generally configured to detect and process sound received via the microphones 115, identify potential voice input in the detected sound, and extract detected-sound data to enable a VAS, such as the VAS 190 (FIG. 1B), to process voice input identified in the detected-sound data. The voice processing components 124 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 124 may include or otherwise take the form of one or more DSPs or one or more modules of a DSP. In this respect, certain voice processing components 124 may be configured with particular parameters (e.g., gain and/or spectral parameters) that may be modified or otherwise tuned to achieve particular functions. In some implementations, one or more of the voice processing components 124 may be a subcomponent of the processor 112*a*.

In some implementations, the voice-processing components 124 may detect and store a user's voice profile, which may be associated with a user account of the MPS 100. For example, voice profiles may be stored as and/or compared to variables stored in a set of command information or data table. The voice profile may include aspects of the tone of frequency of a user's voice and/or other unique aspects of the user's voice, such as those described in previously-referenced U.S. Patent Publication No. 2017-0242653.

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing components 124 receive and analyze the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing components 124 monitor the microphone data for an accompanying user request in the voice input. The user request may include, for example, a command to control a thirdparty device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Controller Devices

FIG. 1H is a partially schematic diagram of one of the control device 130*a* (FIGS. 1A and 1B). As used herein, the term "control device" can be used interchangeably with "controller," "control device," or "control system." Among other features, the control device 130*a* is configured to receive user input related to the MPS 100 and, in response, cause one or more devices in the MPS 100 to perform an action(s) or operation(s) corresponding to the user input. In the illustrated embodiment, the control device 130*a* comprises a smartphone (e.g., an iPhone™, an Android phone) on which media playback system controller application software is installed. In some embodiments, the control device 130*a* comprises, for example, a tablet (e.g., an iPad™), a computer (e.g., a laptop computer, a desktop computer), and/or another suitable device (e.g., a television, an automobile audio head unit, an IoT device). In certain embodiments, the control device 130*a* comprises a dedicated controller for the MPS 100, which may take the form of a software application (e.g., a controller application) that is specific to the particular playback environment in which the MPS 100 is located. For instance, a controller application designed for use with a media playback system in a commercial environment may comprise a different set of dashboards, menus, and other types of information than a controller application that is designed for use with a household media playback system, such as the media playback system shown in FIG. 1A. In other embodiments, as described above with respect to FIG. 1G, the control device 130*a* is integrated into another device in the MPS 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the MPS 100. The memory 132*b* can comprise data storage that can be loaded with one or more of the software components executable by the processor 302 to perform those functions. The software components 132*c* can comprise applications and/or other executable software configured to facilitate control of the MPS 100. The memory 112*b* can be configured to store, for example, the software components 132*c*, media playback system controller application software, and/or other data associated with the MPS 100 and the user.

The network interface 132*d* is configured to facilitate network communications between the control device 130*a* and one or more other devices in the MPS 100, and/or one or more remote devices. In some embodiments, the network interface 132*d* is configured to operate according to one or more suitable communication industry standards (e.g., infrared, radio, wired standards including IEEE 802.3, wireless standards including IEEE 802.11a, 802.11b, 802.11g, 802.12, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 130*a* to one or more of the playback devices 100. The network interface 132*d* can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others. Additional description of zones and groups can be found below with respect to FIGS. 1J through 2.

Figure 1I:
FIG. 1I is a schematic diagram of example user interfaces of the example control device of FIG. 1H.

The user interface 133 is configured to receive user input and can facilitate control of the MPS 100. The user interface 133 includes media content art 133a (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system. FIG. 1I shows two additional user interface displays 133*f* and 133*g* of user interface 133. Additional examples are also possible.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as playback device and an NMD. In other embodiments, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones.

e. Suitable Playback Device Configurations

Figure 2:
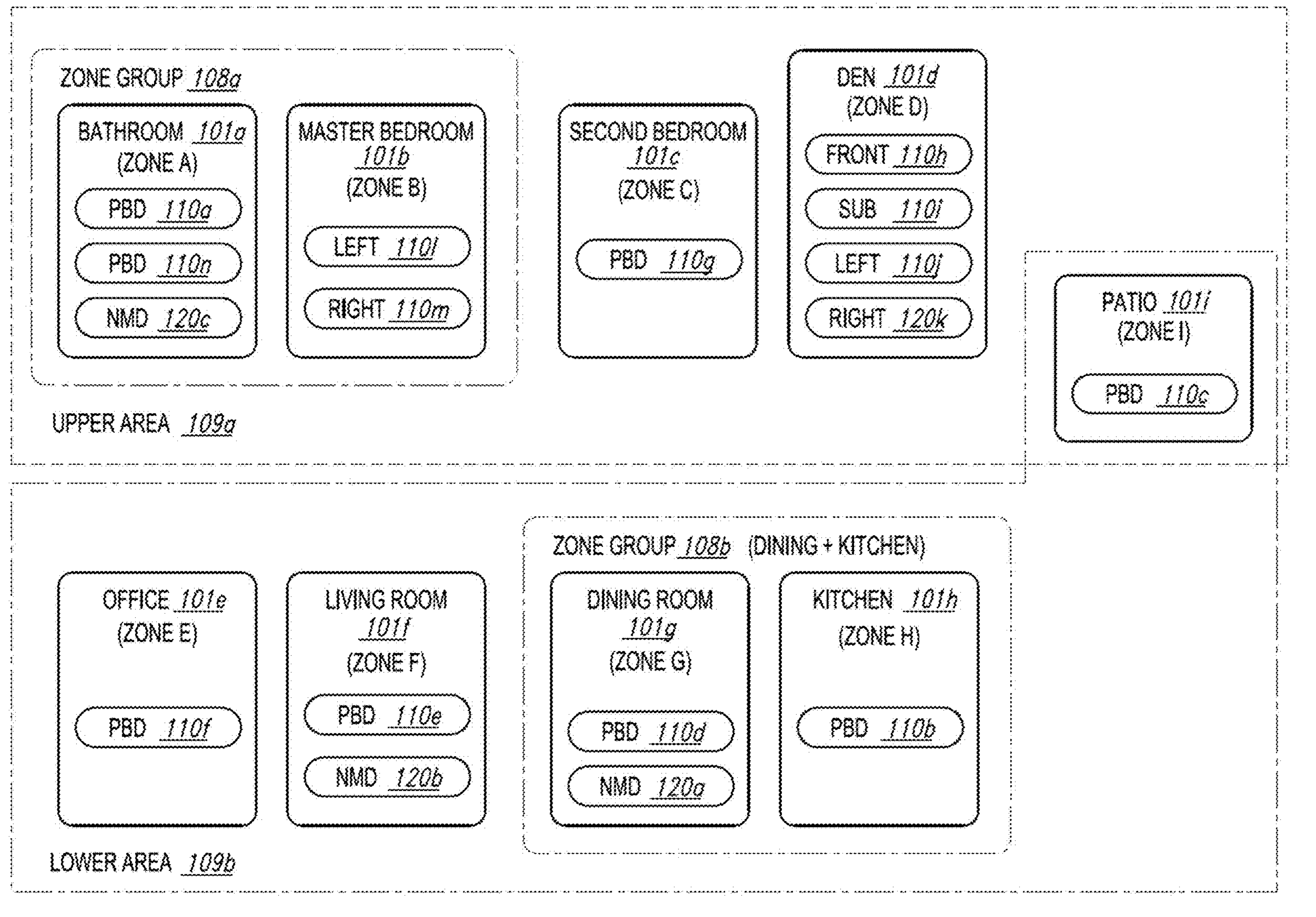
FIG. 2 is a schematic diagram of example media playback system areas.

FIGS. 1J through 2 show example configurations of playback devices in zones and zone groups. Referring first to FIG. 2, in one example, a single playback device may belong to a zone. For example, the playback device 110*g* in the second bedroom 101*c* (FIG. 1A) may belong to Zone C. In some implementations described below, multiple playback devices may be "bonded" to form a "bonded pair" which together form a single zone. For example, the playback device 110*l* (e.g., a left playback device) can be bonded to the playback device 110*m* (e.g., a right playback device) to form Zone A. Bonded playback devices may have different playback responsibilities (e.g., channel responsibilities). In another implementation described below, multiple playback devices may be merged to form a single zone. For example, the playback device 110*h* (e.g., a front playback device) may be merged with the playback device 110*i* (e.g., a subwoofer), and the playback devices 110*j* and 110*k* (e.g., left and right surround speakers, respectively) to form a single Zone D. In another example, the playback zones 110*g* and 110*h* can be merged to form a merged group or a zone group 108*b*. The merged playback zones 110*g* and 110*h* may not be specifically assigned different playback responsibilities. That is, the merged playback zones 110*h* and 110*i* may, aside from playing audio content in synchrony, each play audio content as they would if they were not merged.

Each zone in the MPS 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1J, the playback devices 110*l* and 110*m* may be bonded so as to produce or enhance a stereo effect of audio content. In this example, the playback device 110*l* may be configured to play a left channel audio component, while the playback device 110*k* may be configured to play a right channel audio component. In some implementations, such stereo bonding may be referred to as "pairing."

Additionally, bonded playback devices may have additional and/or different respective speaker drivers. As shown in FIG. 1K, the playback device 110*h* named Front may be bonded with the playback device 110*i* named SUB. The Front device 110*h* can be configured to render a range of mid to high frequencies and the SUB device 110*i* can be configured to render low frequencies. When unbonded, however, the Front device 110*h* can be configured to render a full range of frequencies. As another example, FIG. 1L shows the Front and SUB devices 110*h* and 110*i* further bonded with Left and Right playback devices 110*j* and 110*k*, respectively. In some implementations, the Right and Left devices 110*j* and 110*k* can be configured to form surround or "satellite" channels of a home theater system. The bonded playback devices 110*h*, 110*i*, 110*j*, and 110*k* may form a single Zone D (FIG. 2).

Playback devices that are merged may not have assigned playback responsibilities and may each render the full range of audio content the respective playback device is capable of. Nevertheless, merged devices may be represented as a single UI entity (i.e., a zone, as discussed above). For instance, the playback devices 110*a* and 110*n* in the master bathroom have the single UI entity of Zone A. In one embodiment, the playback devices 110*a* and 110*n* may each output the full range of audio content each respective playback devices 110*a* and 110*n* are capable of, in synchrony.

In some embodiments, an NMD is bonded or merged with another device so as to form a zone. For example, the NMD 120*b* may be bonded with the playback device 110*e*, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 2, Zone A may be grouped with Zone B to form a zone group 108*a* that includes the two zones. Similarly, Zone G may be grouped with Zone H to form the zone group 108*b*. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108*b* can have be assigned a name such as "Dining+Kitchen", as shown in FIG. 2. In some embodiments, a zone group may be given a unique name selected by a user.

Certain data may be stored in a memory of a playback device (e.g., the memory 112*c* of FIG. 1C) as one or more state variables that are periodically updated and used to describe the state of a playback zone, the playback device(s), and/or a zone group associated therewith. The memory may also include the data associated with the state of the other devices of the media system and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "al" to identify playback device(s) of a zone, a second type "b1" to identify playback device(s) that may be bonded in the zone, and a third type "c1" to identify a zone group to which the zone may belong. As a related example, identifiers associated with the second bedroom 101*c* may indicate that the playback device is the only playback device of the Zone C and not in a zone group. Identifiers associated with the Den may indicate that the Den is not grouped with other zones but includes bonded playback devices 110*h*-110*k*. Identifiers associated with the Dining Room may indicate that the Dining Room is part of the Dining+Kitchen zone group 108*b* and that devices 110*b* and 110*d* are grouped (FIG. 1M). Identifiers associated with the Kitchen may indicate the same or similar information by virtue of the Kitchen being part of the Dining+Kitchen zone group 108*b*. Other example zone variables and identifiers are described below.

In yet another example, the MPS 100 may include variables or identifiers representing other associations of zones and zone groups, such as identifiers associated with Areas, as shown in FIG. 2. An area may involve a cluster of zone groups and/or zones not within a zone group. For instance, FIG. 2 shows an Upper Area 109*a* including Zones A-D, and a Lower Area 109*b* including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. patent application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

Figure 3:
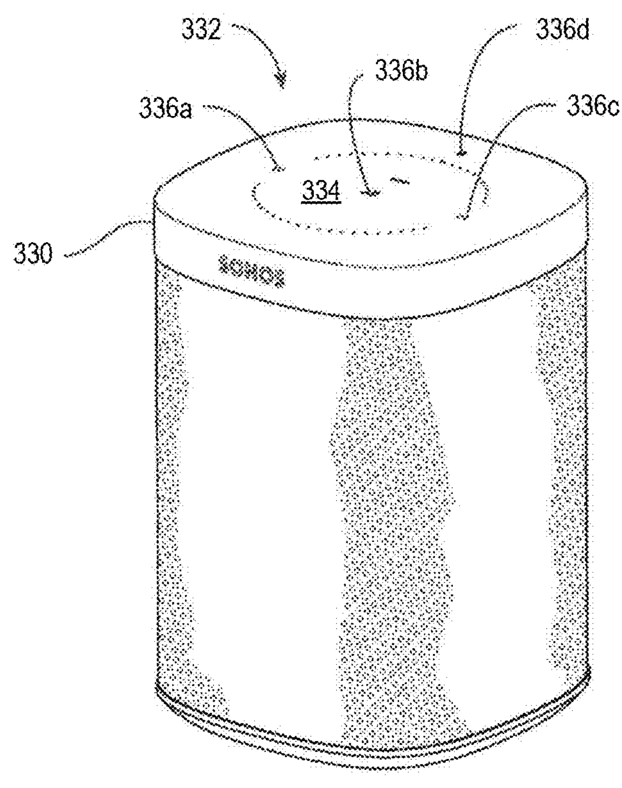
FIG. 3 is an isometric diagram of an example playback device housing.

FIG. 3 shows an example housing 330 of the playback device 110 that includes a user interface in the form of a control area 332 at a top portion 334 of the housing 330. The control area 332 includes buttons 336-*c* for controlling audio playback, volume level, and other functions. The control area 332 also includes a button 236*d* for toggling the microphones 222 to either an on state or an off state. The control area 332 is at least partially surrounded by apertures formed in the top portion 334 of the housing 330 through which the microphones 222 (not visible in FIG. 3) receive the sound in the environment of the playback device 110. The microphones 222 may be arranged in various positions along and/or within the top portion 334 or other areas of the housing 330 so as to detect sound from one or more directions relative to the playback device 110.

In some embodiments, the playback device 110 may take the form of a wired and/or wireless headphone (e.g., an over-ear headset, an on-ear headset, or an in-ear headset). For instance, FIG. 4 shows an example headset assembly 400 ("headset 400") for such an implementation of the playback device 110. As shown, the headset 400 includes a headband 402 that couples a first earcup 404*a* to a second earcup 404*b*. Each of the earcups 404*a* and 404*b* may house any portion of the electronic components in the playback device 110, such as one or more speakers. Further, one or more of the earcups 404*a* and 404*b* may include a user interface for controlling audio playback, volume level, and other functions. The user interface may include any of a variety of control elements such as a physical button 408, a slider, a knob, and/or a touch control surface. As shown in FIG. 4, the headset 400 may further include ear cushions 406*a* and 406*b* that are coupled to ear cups 404*a* and 404*b*, respectively. The ear cushions 406*a* and 406*b* may provide a soft barrier between the head of a user and the earcups 404*a* and 404*b*, respectively, to improve user comfort and/or provide acoustic isolation from the ambient (e.g., passive noise reduction (PNR)).

III. Example Internet Radio Platform

Figure 5:
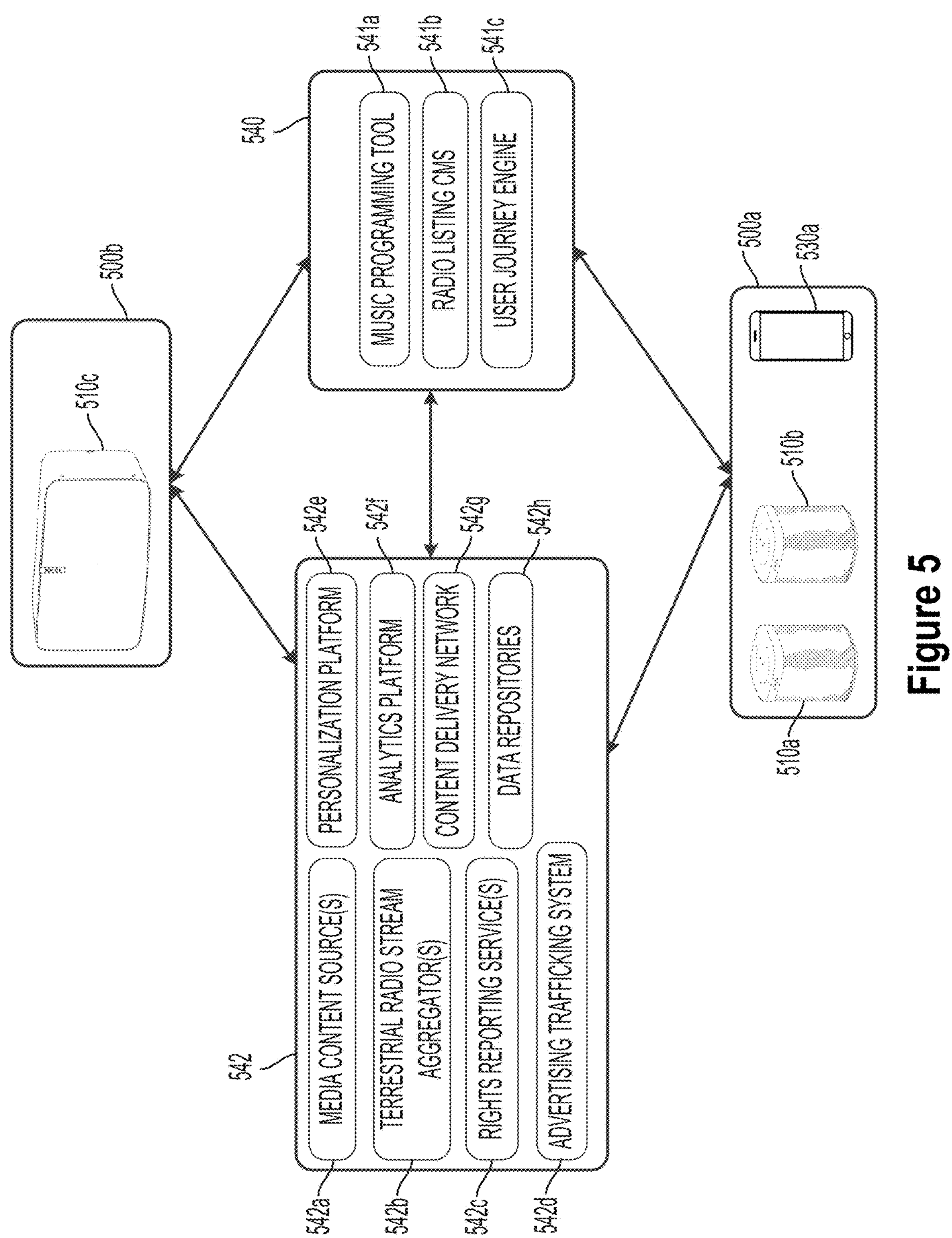
FIG. 5 is a schematic diagram of a computing system for providing internet radio content.

FIG. 5 is a schematic diagram of a computing system 540 that facilitates providing internet radio content to one or more media playback systems as discussed herein. For example, the computing system 540 may include one or more computing devices, including the computing device(s) 106*b* and/or 106*c* shown in FIG. 1B and discussed above. The computing system 540 may include, for example, a music programming tool 541*a* that may be used by administrators of the media playback system provider to assemble and program the media content for each internet radio station's playlist. Further, the computing system 540 may include a radio listing content management system (CMS) 541*b*. The radio listing CMS 541*b* may be used to find, verify, and store data regarding terrestrial radio streams that may be provided by one or more terrestrial radio stream aggregators.

The computing system 540 may also include a user journey engine 541*c*, which may utilize operational data from a given media playback system, such as the media playback system 500*a*, or from a particular playback device such as the playback device 510*a*, to make predictions regarding user interests and/or user activity within the media playback system 500*a*. In some implementations, the user journey engine 541*c* may coordinate with other computing systems to make such predictions, as further discussed below. As one example, this information may be used to provide targeted advertisements to the media playback system 500*a*.

FIG. 5 also shows a plurality of additional computing systems 542 with which the computing system 540 may integrate and/or cooperate. For example, the additional computing systems 542 include media content sources 542*a* operated by a respective media content service, such as the example media content services 192 discussed above (e.g., SPOTIFY, etc.). In some implementations, for the internet radio content discussed herein, the media playback system provider itself (e.g., Sonos) may operate similar to the media content services 192 discussed above, curating and assembling the internet radio content and maintaining one or more of the media content source(s) 542*a* shown in FIG. 5. The additional computing systems 542 may also include terrestrial radio stream aggregators 542*b* and rights reporting services 542*c* that track the digital rights associated with given media content. For instance, unlike traditional terrestrial radio where it may be difficult to determine how many listeners were tuned in during playback of a given song, the implementations discussed herein can provide much more granular listener information. Operational data from one or more media playback systems may indicate, for example, how many playback devices played back a given song, where the playback devices were likely located, an estimation of user presence, among other information. In some cases, this additional information may be used to develop more specific arrangements and fee schedules for the licensing of digital content playback.

The additional computing systems 542 may also include an advertisement trafficking system 542*d*, a personalization platform 542*e*, and an analytics platform 542*f*, among many other possibilities. Further, the computing system 540 may cooperate with computing systems and networks that facilitate the data exchanges involved herein, including a content delivery network (CDN) 542*g*, and one or more data repositories 542*h*.

For instance, a first media playback system 500*a* and a second media playback system 500*b* may receive media content corresponding to an internet radio stream via the CDN 542*g*. As the media content is played back by a first playback device 510*a* and a second playback device 510*b* in the first media playback system 500*a*, and by a third playback device 510*c* in the second media playback system 500*b*, operational data corresponding to each system may be stored in the one or more data repositories 542*h*. As discussed above, the operational data may include, for each media playback system, listening history corresponding to one or more identified user profiles, the number, model(s), configuration(s), and/or playback settings of the playback devices in the media playback system, data regarding the media content sources available to the media playback system, indications of possible playback device locations within the media playback system, and indications of the likelihood of user presence, among other examples.

In some implementations, the user journey engine 541*c* may access the operational data stored in the data repositories 542*h* and then coordinate with one or both of the personalization platform 542*e* and the analytics platform 542*f* in order to analyze the data and make predictions regarding user interests and/or user activity within a given media playback system. For instance, operational data may be available from a substantial number of diverse media playback systems. The user journey engine 541*c* may work in conjunction with the analytics platform 542*f* to apply machine learning and/or other analytics to determine outcomes that are correlated with certain aspects of the operational data, and to predict future outcomes based on related or similar operational data. Further, the user journey engine 541*c* may further coordinate with the personalization platform 542*e* to apply trends and other predictive information discussed herein to any number of products, services, media content, and the like in a way that presents targeted advertisements that are more likely to be meaningful to particular users of a given media playback system.

This information may then be utilized in conjunction with the advertisement trafficking system 542*d* to provide the targeted advertisements as part of a given internet radio stream. In some implementations, a given advertisement may be played during a time slot designated for advertisements that occurs between songs of the internet radio stream, i.e., after the end of one song and before the beginning of the next song. In other embodiments, the advertisement trafficking system 542*d* may analyze the upcoming audio content of a given internet radio stream to identify periods within the audio content that are conducive to overlaying the playback of an advertisement. For example, a song that fades out with a lengthy ending may lend itself to overlaying the audio of an advertisement. Similarly, a song with a lengthy build-up at the beginning of the song may also be a candidate for overlaid advertisements. Thus, the advertisement trafficking system 542*d* may overlay a given advertisement onto the transition between two appropriately selected songs, such that the advertisement plays over the end of the first and the beginning of the second song. In some embodiments, the volume level of the underlying songs might be ducked to improve clarity of the advertisements. Other examples are also possible.

As shown in FIG. 5, both the media playback system 500*a* and the media playback system 500*b* communicate with the computing system 540 as well as one or more of the additional computing systems 542 during playback of content from a given internet radio station. For example, the computing system 540 maintains a playlist of one or more media items in a queue for playback, along with an indication of a current playback position within the playlist, which is always advancing. To facilitate playback, the computing system 540 may provide one or more media items from the playlist to the playback device 510*a*, along with an indication of the current playback position. The current playback position may be, for example, a timestamp corresponding to a position within a given media content, or an indication of a particular audio frame with the media content where playback should begin. The indications of the current playback position may take other forms as well.

The one or more media items provided by the computing system 540 to the playback device 510*a* may include a URI, a URL, or a similar identifier that allows the playback device 510*a* to retrieve the media content for playback. For example, the one or more media items may "point" to media content on one or more of the media content sources 542*a* shown in FIG. 5. As playback continues and the current playback position progresses, the computing system 540 may send additional media items from the playlist to the playback device 510*a*. In some implementations, the computing system 540 might also send an updated indication of the current playback position, which may allow the playback device 510*a* to update its playback position if it has drifted beyond a predetermined threshold. For example, the media playback system 500*a* may experience network attenuation that delays the retrieval of media content from the media content source 542*a*, causing the playback device 510*a* to "fall behind" the current playback position maintained by the computing system 540. If the playback device 510*a* determines that the delay is greater that a maximum value, such as 5 seconds, the playback device 510*a* may adjust playback of the media content so as to reduce the delay. Other thresholds are also possible.

Conversely, the computing system 540 may provide an indication of the current playback position that incorporates an allowance for some delay that may be expected for a given playback device to retrieve the media content. For example, such an allowance may be based on average media content retrieval speeds across a large number of playback devices, which may be available from the collected operational data. However, if the first playback device 510*a* is instead experiencing network speeds that are greater than average, its playback position may begin to drift ahead of the current playback position maintained by the computing system 540, and a similar correction may be required.

Such a correction might take various forms. For instance, if the computing system 540 determines that a given playback device's playback of the internet radio content has drifted too far ahead or too far behind other playback devices that are playing the same content, the computing system 540 may adjust the audio content that is provided to the given playback device. For example, the computing system 540 may timestretch the audio content of a song, or a portion thereof, to increase or decrease its tempo without changing its pitch, and then provide the adjusted audio content to the given playback device while other playback devices receive unadjusted content. In this way, the given playback device may become resynchronized, or substantially resynchronized, with other playback devices that are playing the same internet radio station.

Additionally or alternatively, a given playback device may determine that its current playback position within the playlist of media items is behind the indicated playback position provided by the computing system 540 by more than a threshold value, such as 5 seconds. In response, the given playback device may undertake a similar adjustment of the audio content that is received from the computing system 540. For example, the given playback device may timestretch the audio content to increase its tempo as discussed above, and then play back the adjusted audio content to thereby reduce the difference in its playback position.

In some implementations, the computing system 540 may provide a media item to the playback device 510*a* that corresponds to limited-access media content for which the playback device 510*a* might not have access credentials to browse or retrieve under other circumstances. Nonetheless, the limited-access media content may be enabled for retrieval and playback when accessed as part of the internet radio stream discussed herein.

In a similar way, the computing system 540 may provide one or more media items and an indication of the current playback position within the playlist to the playback device 510*c* of the second media playback system 500*b*. This may result in the substantially synchronous playback of the internet radio stream by the playback device 510*a* and the playback device 510*c*. For instance, differences in playback timing up to 5 or even 10 seconds, which would be unacceptable in a multi-room playback scenario, may not have any appreciable impact on users listening to the same internet radio stream in separate media playback systems.

Figure 6:
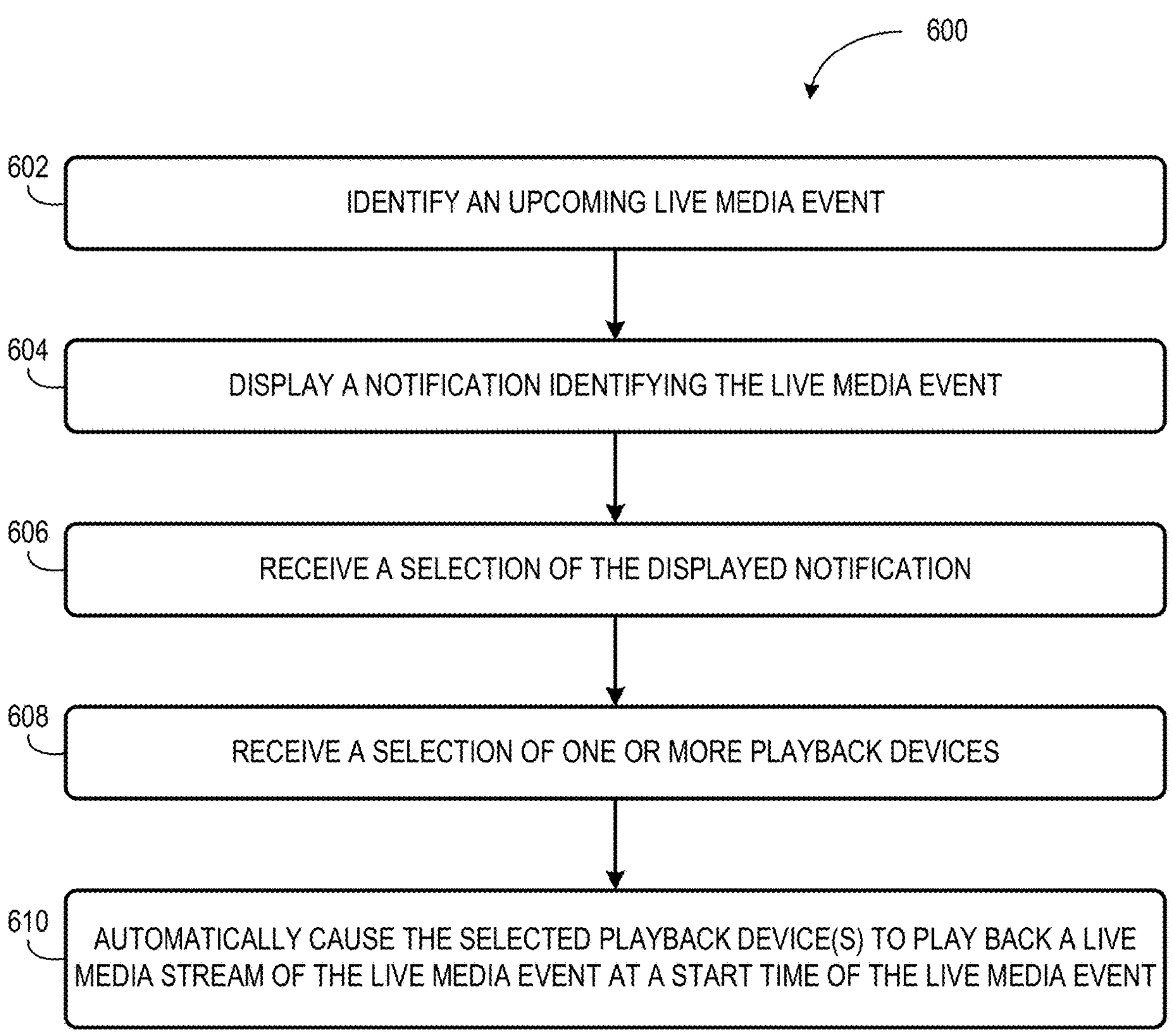
FIG. 6 is a flowchart of one example process for scheduling automatic playback of a media stream for an upcoming live media event at a future time.

FIG. 6 depicts a flowchart of an example process 600 for scheduling automatic playback of a media stream for an upcoming live media event at a future time. The example process 600 may be carried out by a computing device, such as one or more of the control devices 130, to cause playback of the media stream of the live media event by one or more playback devices of a media playback system, such as one or more of the playback devices 110 of the media playback system 100. The example process 600 may include one or more operations, functions, or actions as illustrated by one or more of blocks 602-610. Although blocks 602-610 are illustrated in sequential order, these blocks may also be performed in parallel, and/or in a different order than those described herein, where possible. Also, the various blocks may be combined into fewer blocks, divided into additional blocks, and/or removed based upon the desired implementation.

In addition, for the process 600, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the process 600 and any other processes and methods disclosed herein, each block shown in FIG. 6 may represent circuitry that is wired to perform the specific logical functions in the process.

Turning to the example method 600 of FIG. 6, at block 602, the computing device may identify an upcoming live media event. The live media event may take various forms. For instance, the live media event may be a live musical event, such as a concert, a sporting event, or a live speaking event, such as a live podcast, lecture, book reading, or the like. These examples are merely illustrative, and the live media event may take the form of any other live media event as well.

The computing device may identify the upcoming live media event in various ways. In some examples, the computing device may receive identifying information about the upcoming live media event from one or more of computing systems 540 or 542. For instance, the radio listing CMS 541*b* or one of the media content sources 542*a* may be configured to store information about various upcoming live media events and may provide such information to the computing device. The information stored by computing system 540 and/or 542 and provided to the computing device may include dates of the events, start times of the events, artists or other sources of the media at the events, descriptions of the events, and/or artwork associated with the events (e.g., poster images, album art, book covers, etc.).

In some examples, the identifying information about a given upcoming live media event may additionally or alternatively include a URI (e.g., a URL) or a similar identifier corresponding to a network address at which a live media stream of the live media event will be accessible during the event. For instance, the live media event may be outfitted with various recording equipment for capturing audio and/or video of the event. The captured audio and/or video may be uploaded in real-time or near real-time to one or more media servers, such as a media server hosted by one of the media content sources 542*a*. As such, the media content source 542*a* may generate a URI identifying the network address at the media server where the captured audio and/or video of the live event will be uploaded, and the media content source 542*a* may provide this URI to the computing device as part of the information identifying the live media event.

The computing device may identify a particular upcoming live media event based on a media consumption history of a user account associated with the computing device. For example, the user journey engine 541*c* may determine that the user account associated with the computing device has played back media content from a particular artist and, based on this determination, identify a particular upcoming live media event that includes the particular artist. The user journey engine 541*c* may then cause computing system 540 or 542 to send the identifying information of the particular live media event to the computing device. Computing system 540 or 542 may additionally send an instruction to the computing device to display a notification identifying the live media event based on the identifying information via a graphical user display of the computing device.

Figure 7:
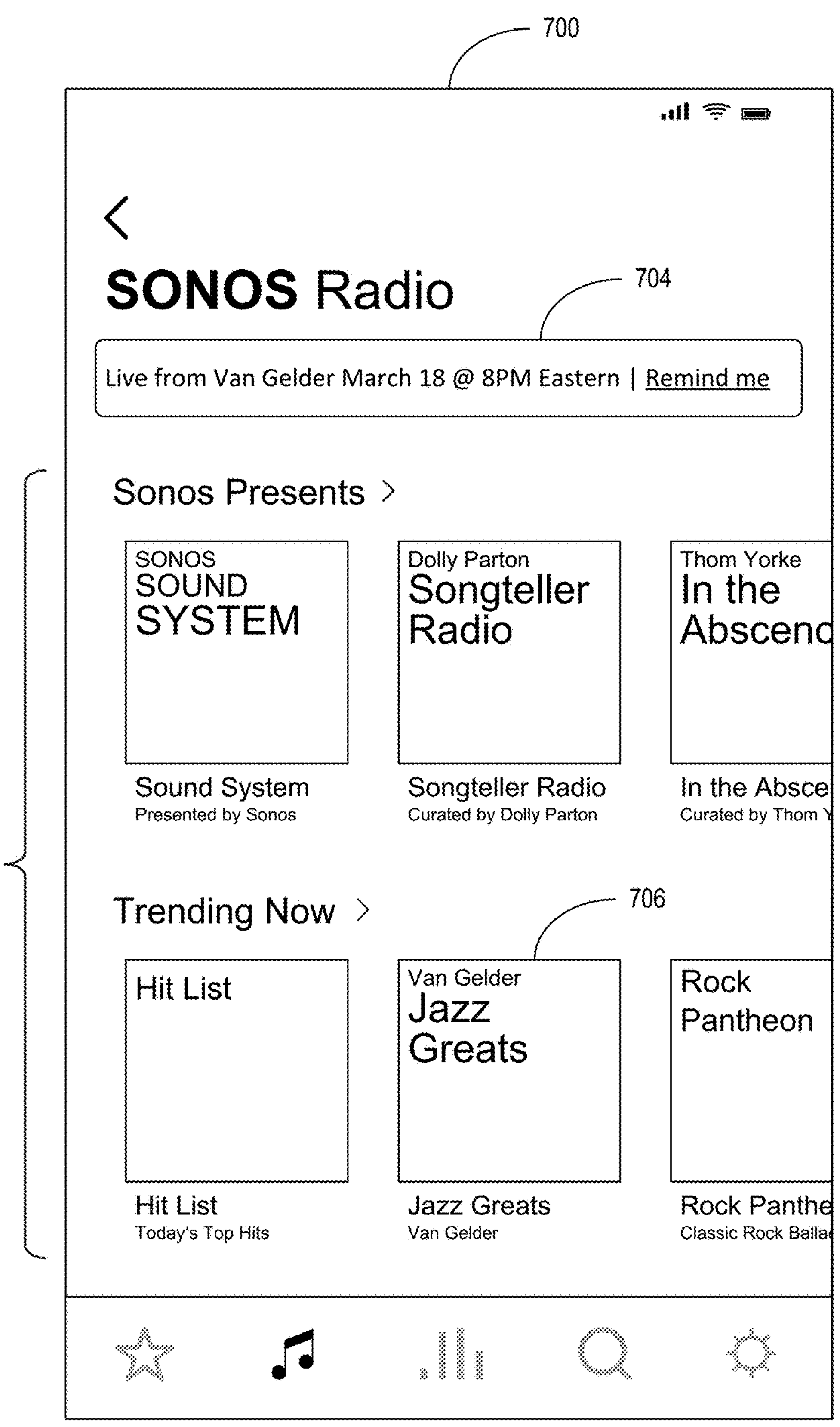
FIG. 7 is a schematic diagram of an example user interface for scheduling automatic playback of a media stream for an upcoming live media event at a future time.

At block 604, the computing device may display a notification identifying the upcoming live media event based on the information received from computing system 540 or 542. FIG. 7 depicts an example display 700 that the computing device may display via its graphical user interface in order to provide an indication of the upcoming live media event. As shown, the display 700 may be populated with information identifying various internet radio content 702 that is available for playback using the internet radio platform described above in connection with FIG. 5. Notably, the display 700 further includes a notification 704 identifying the upcoming live media event.

The displayed notification 704 may include some or all of the information identifying the media event received from computing system 540 or 542 at block 602. For instance, as shown in FIG. 7, the notification 704 may include information identifying the date and time of the event, an artist of the event, and a name or description of the event. The computing device may display the notification 704 in a manner such that the notification 704 is selectable through user input. For instance, as shown in FIG. 7, the computing device may cause the notification 704 to include a selectable portion of text that reads "Remind me." This is merely an illustrative example, and the notification 704 may take other selectable forms as well.

The displayed notification 704 may be a persistent or semi-persistent notification. For example, the computing device may cause the notification 704 to be continually displayed (e.g., in the form of a banner on a content selection screen, as depicted in FIG. 7) during a time period leading up to the live event. In such an implementation, the notification 704 may further include a selectable option for dismissing the banner if the user does not have an interest in the live event. For instance, the computing device may store state information corresponding to the notification 704 and indicating whether the user has selected the dismiss option. In response to receiving a user input for dismissing the banner, the computing device may update the state information to reflect the user selection and cause the display 700 to no longer include the notification 704.

At block 606, the computing device may receive a selection of the displayed notification 704. The selection may include various forms of user input, such as a touch input via a touch-sensitive display of the computing device, a mouse input, a voice input, a keyboard input, or the like.

At block 608, the computing device may receive a selection of one or more playback devices for playing back a live media stream of the live media event. The computing device may receive this selection of playback devices based on the selection of the notification 704. For instance, in response to receiving the selection of the notification 704, the computing device may display a prompt for user input selecting one or more playback devices.

Figure 8:
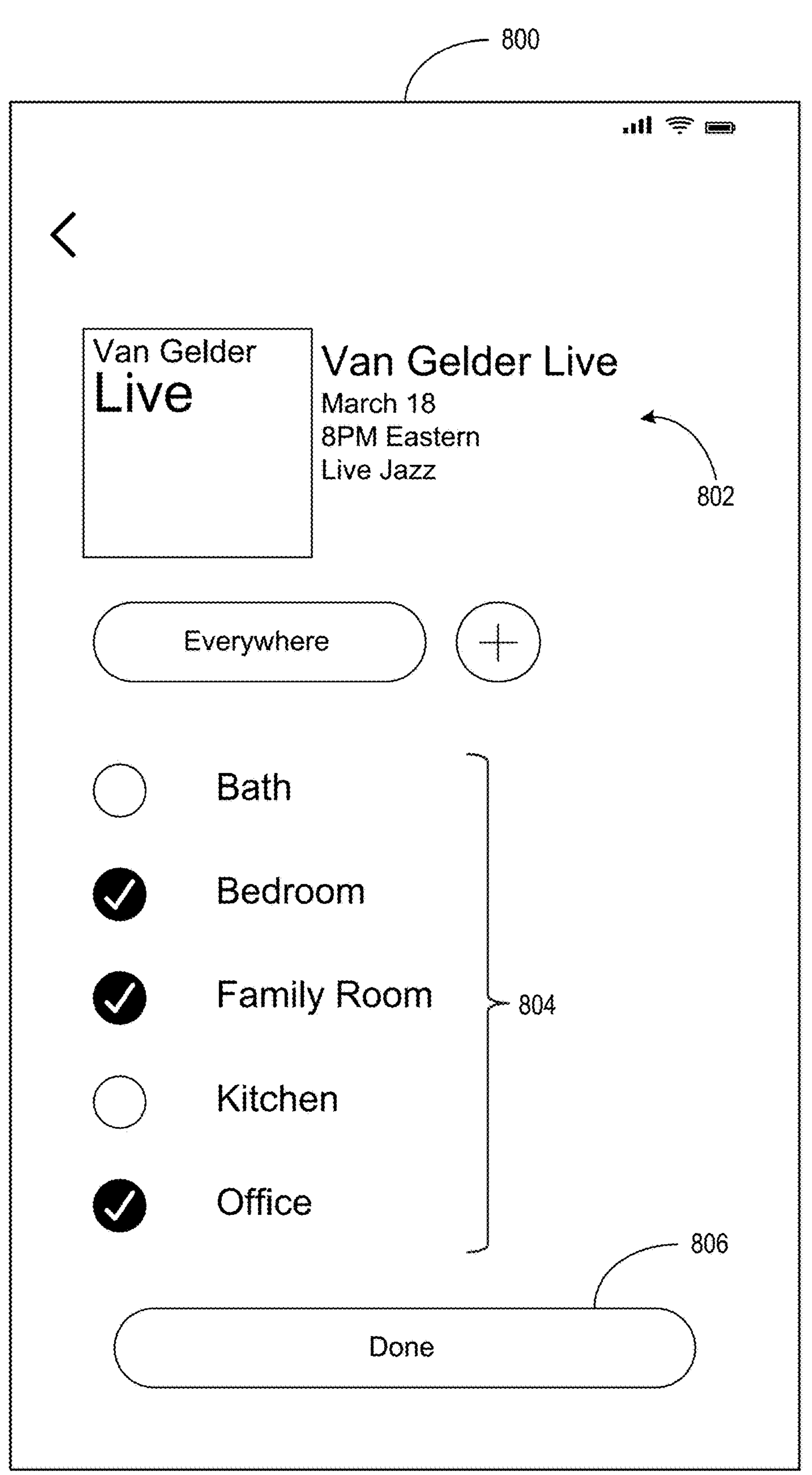
FIG. 8 is a schematic diagram of an example user interface for scheduling automatic playback of a media stream for an upcoming live media event at a future time.

FIG. 8 depicts an example display 800 that the computing device may display via its graphical user interface in order to prompt a user to select one or more playback devices. As shown, the display 800 may include some or all of the information identifying the media event received from computing system 540 or 542 at block 602. For instance, as shown in FIG. 8, the display 800 may be populated with identifying information 802 that includes artwork associated with the event, a name of the event, the date and time of the event, an artist of the event, and a brief description of the event.

As further shown in FIG. 8, the display 800 may include a list of available playback devices 804 for playing back the live media stream of the live media event. The list of available playback devices 804 may include some or all of the playback devices in a media playback system associated with the computing device. For instance, as noted above, the computing device may take the form of the control device 130 in MPS 100, such that the list of available playback devices 804 may include all of the playback devices 110 in MPS 100.

In some examples, the list of available playback devices 804 may include groupings of playback devices. For instance, as described above, the playback devices 110 in MPS 100 may be grouped into playback zones corresponding to different rooms 101 of the environment of the MPS 100. As such, the list of available playback devices 804 may additionally or alternatively include such playback zones of the MPS 100.

The computing device may display the list of available playback devices 804 in a manner such that the playback devices included in the list 804 are selectable through user input. For instance, as shown in FIG. 8, the computing device may cause the list of available playback devices 804 to include selectable checkboxes. However, this is merely an illustrative example, and the list of available playback devices 804 may take other selectable forms as well. Further, as shown, the display 800 may include a selectable confirmation button 806 for confirming the selected playback devices in the list of available playback devices 804.

Based on the selection of the playback devices at block 608, the computing device may schedule the automatic playback of the live media stream of the live media event by the selected playback devices. For instance, the computing device may store timing data corresponding to the start time of the live media event, as well as playback device data corresponding to the playback devices selected at block 608. The computing device may then occasionally or periodically compare a current time of the computing device to the timing data to determine whether to automatically initiate playback of the live media stream of the live media event. Additionally or alternatively, the computing device may cause the timing data and/or the playback device data to be stored at computing system 540 or 542, and computing system 540 or 542 may compare a current time to the timing data to determine whether to cause the computing device to automatically initiate playback of the live media stream of the live media event.

At block 610, the computing device or computing system 540 or 542 may determine that the current time of the computing device matches the start time of the live media event, and, based on this determination, the computing device may automatically cause the one or more playback devices selected at block 608 to play back a live media stream of the live media event. To do so, the computing device may send an instruction to the selected playback devices that causes the playback devices to access the URI received at block 602. As described above, an audio and/or video recording of the live media event may be uploaded in real-time or near-real time to one or more media servers, such that a live media stream of the event is accessible at the URI. Thus, by accessing and retrieving the media content at the URI, the selected playback devices can play back the live media stream of the live media event. When playing back the live media stream, the selected playback devices may do so in synchrony in the manner described above.

In order to cause the selected playback devices to synchronously play back the live media stream, the computing device may group the selected playback devices to form a zone group. In some examples, this may involve ungrouping any of the selected playback devices from their existing zone groups and adding them to a new zone group. In other examples, this may involve merging preexisting zone groups into a single zone group. Other examples are possible as well. In examples where the computing device removes one or more of the selected playback devices from their existing zone group, the computing device may do so without interrupting the media playback of the existing group. For instance, if an existing zone group includes first, second and third playback devices already playing back media content at the start time of the live event, and only the first playback device has been selected for playback of the media stream of the live event, the computing device may remove the first playback device from the existing zone group in order to cause the first playback device to play back the media stream of the live event while causing the second and third playback device to continue playing back the media content of the existing zone group.

In some examples, the live media stream of the live media event may not be available precisely at the scheduled start time of the event. For instance, live events may be delayed due to unexpected circumstances, such as technical difficulties, weather events, scheduling errors, or other delays. And if the live event is delayed, so too may be the upload of the live media stream to the media servers. In such a circumstance, causing the playback devices to stream media content from the URI may result in a failure to playback any media content at all. To account for this, the media content source 542*a* may be configured to assign a placeholder media content to the URI in advance of the start time of the live event. The placeholder media content may include prerecorded media content that may or may not be related to the live event, such as a prerecorded album of an artist at a live musical concert. For instance, if the live event is part of a concert tour to promote a new album, then the placeholder media content may include the album being promoted by the concert tour. As another example, the placeholder content may include media content designed to promote the live event. Examples of such promotional media content may include media playlists or internet radio stations specifically designed to promote the live event. For instance, in the example depicted in FIG. 7, the live event is a Van Gelder concert, and so the placeholder content may include a promotional internet radio station 706 designed around the music of Van Gelder.

Once the live media stream is ready for upload to the media servers, the media content source 542*a* may then reassign the URI to the live media stream. In this way, if the live event is delayed, then when the computing device causes the playback devices to automatically stream content from the URI, the playback devices will be able to playback the placeholder content instead of no content at all, which may result in an improved user experience.

Further, in some examples, when the computing device attempts to automatically cause the one or more playback devices selected at block 608 to play back a live media stream of the live media event, there may be a scenario in which the one or more playback devices are already playing back media content. In such a scenario, the computing device may be configured to cause the playback devices to cease playback of any media content currently being played back and start playback of the live media stream.

In some examples, causing the one or more playback devices selected at block 608 to play back a live media stream of the live media event may involve invoking a zone scene that has been preconfigured to cause the playback devices to play back the live media stream of the live media event. Examples of configuring and invoking zone scenes are described in U.S. Pat. No. 10,469,966, issued on Nov. 5, 2019, and titled "Zone Scene Management," which is incorporated herein by reference in its entirety. The computing device may invoke the zone scene at the start time of the live event or at some predefined time offset from the start time, such as five minutes before the event.

Further, in some examples, instead of automatically causing the one or more playback devices selected at block 608 to play back the live media stream of the live media event, the computing device may first display a prompt for user input confirming that the playback devices should play back the live media stream. The computing device may display such a prompt at the start time of the event or at some predefined time offset from the start time, such as five minutes before the event. Responsive to receiving user input confirming the playback, the computing device may cause the playback devices to play back the live media stream. Additionally or alternatively, the prompt may include a "snooze" feature. For example, the prompt may allow the user to select a predefined or user-specified time period for snoozing the prompt or for snoozing the playback of the live media stream. If snoozing the prompt, the computing device may dismiss the prompt for the duration of the snooze period and then redisplay the prompt for confirming playback of the live media stream at the end of the snooze period. If snoozing the playback of the live media stream, the computing device may delay causing the playback devices to play back the live media stream until the end of the snooze period.

During playback of the live media stream, the playback may be altered using various transport control mechanisms described herein. For instance, as described above, the control device 130 may be used to adjust a volume of the playback and to pause or resume the playback. However, because the media content is a live stream, resuming playback after pausing will rejoin playback of the stream at the live position as the content is streamed in real-time or near real-time from the URI and is not stored for on-demand access.

In some examples, the features described herein related to scheduling the playback of a live media stream may be a premium service available to only a subset of end users. For instance, in order to access such features, an end user may first need to subscribe to a service, such as by subscribing to a premium version of an internet radio service provided by the internet radio platform described above. If the end user of the computing device is not subscribed to the premium service, then the computing device may still display the notification 704, but upon selection of the notification 704, the computing device may prompt the user to subscribe to the premium service and navigate the user to a subscription portal where the user may subscribe to the service. As another example, the features described herein may be a paid service subject to payment of a one-time service fee, in which case the computing device may similarly prompt the user to pay the fee and navigate the user to a payment portal in response to the user selecting the notification 704. The computing device may then only provide the remaining features described herein upon determining that the user has paid the appropriate subscription or service fee.

Some of the figures discussed herein include one or more operations, functions, or actions as illustrated by one or more of operational blocks. Although the blocks are illustrated in a given order, some of the blocks may also be performed in parallel, and/or in a different order than those described herein. Also, the various blocks may be combined into fewer blocks, divided into additional blocks, and/or removed based upon the desired implementation.

In addition, for the flowcharts shown in the figures and other processes and methods disclosed herein, the diagrams show functionality and operation of one possible implementation of present embodiments. In this regard, each block may represent a module, a segment, or a portion of program code, which includes one or more instructions executable by one or more processors for implementing logical functions or blocks in the process.

The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the processes and methods disclosed herein, each block may represent circuitry and/or machinery that is wired or arranged to perform the specific functions in the process.

VI. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A computing system comprising:
- at least one processor;
- at least one non-transitory computer-readable medium; and
- program instructions stored on the at least one non-transitory computer-readable medium that, when executed by the at least one processor, cause the computing system to:
  - determine (i) a future start time of an upcoming live media event and (ii) an identifier of a media source from which a live media stream of the live media event will be accessible at the future start time;
  - transmit, to a computing device of a media playback system, information comprising a selectable notification identifying the live media event for display via a user interface of the computing device;
  - receive, from the computing device, information indicating (i) a first selection of the notification and (ii) a second selection of one or more playback devices of the media playback system; and
  - based on the information indicating the first and second selections, cause, at the start time of the live media event, at least one of the one or more playback devices to use the identifier to access the live media stream from the media source for synchronous playback by the one or more playback devices.

2. The computing system of claim 1, further comprising program instructions stored on the at least one non-transitory computer-readable medium that, when executed by the at least one processor, cause the computing system to:
- store information indicating (i) the future start time of the upcoming live media event and (ii) the one or more playback devices of the media playback system.

3. The computing system of claim 1, wherein the program instructions that, when executed by the at least one processor, cause the computing system to receive information indicating the second selection of one or more playback devices of the media playback system comprise program instructions that, when executed by the at least one processor, cause the computing system to receive information indicating a zone scene comprising a predefined grouping of one or more playback devices of the media playback system that are to be configured for playback of the upcoming live media event when the zone scene is invoked; and
- wherein the program instructions that, when executed by the at least one processor, cause the computing system to cause at least one of the one or more playback devices to use the identifier to access the live media stream from the media source comprise program instructions that, when executed by the at least one processor, cause the computing system to cause the zone scene to be invoked.

4. The computing system of claim 3, wherein the zone scene comprises a predefined grouping of two or more playback devices that are to be configured for synchronous playback of the upcoming live media event when the zone scene is invoked, and wherein the program instructions that, when executed by the at least one processor, cause the computing system to cause the zone scene to be invoked comprise program instructions that, when executed by the at least one processor, cause the computing system to:

cause the zone scene to be invoked such that the two or more playback devices play back the live media event in synchrony at the start time of the live media event.

5. The computing system of claim 3, wherein the program instructions that, when executed by the at least one processor, cause the computing system to cause the zone scene to be invoked comprise program instructions that, when executed by the at least one processor, cause the computing system to:

cause the zone scene to be invoked such that at least one of the one or more playback devices accesses the live media stream from the media source at a predefined time offset before the future start time.

6. The computing system of claim 3, wherein the one or more playback devices are playing back media content when the zone scene is invoked, and wherein the program instructions that, when executed by the at least one processor, cause the computing system to cause the zone scene to be invoked comprise program instructions that, when executed by the at least one processor, cause the computing system to:

cause the zone scene to be invoked such that the one or more playback devices cease playback of the media content.

7. The computing system of claim 3, wherein the program instructions that, when executed by the at least one processor, cause the computing system to cause the zone scene to be invoked comprise program instructions that, when executed by the at least one processor, cause the computing system to:

cause the computing device to invoke the zone scene and thereby initiate playback of the live media stream by the one or more playback devices.

8. The computing system of claim 1, further comprising program instructions stored on the at least one non-transitory computer-readable medium that, when executed by the at least one processor, cause the computing system to:

determine a media consumption history of a user account associated with the computing device; and select the upcoming live media event from among a plurality of upcoming live media events based on the determined media consumption history.

9. A non-transitory computer-readable medium, wherein the non-transitory computer-readable medium is provisioned with program instructions that, when executed by at least one processor, cause a computing system to:

determine (i) a future start time of an upcoming live media event and (ii) an identifier of a media source from which a live media stream of the live media event will be accessible at the future start time;

transmit, to a computing device of a media playback system, information comprising a selectable notification identifying the live media event for display via a user interface of the computing device;

receive, from the computing device, information indicating (i) a first selection of the notification and (ii) a second selection of one or more playback devices of the media playback system; and based on the information indicating the first and second selections, cause, at the start time of the live media event, at least one of the one or more playback devices to use the identifier to access the live media stream from the media source for synchronous playback by the one or more playback devices.

10. The non-transitory computer-readable medium of claim 9, wherein the non-transitory computer-readable medium is also provisioned with program instructions that, when executed by the at least one processor, cause the computing system to:

store information indicating (i) the future start time of the upcoming live media event and (ii) the one or more playback devices of the media playback system.

11. The non-transitory computer-readable medium of claim 9, wherein the program instructions that, when executed by at least one processor, cause the computing system to receive information indicating the second selection of one or more playback devices of the media playback system comprise program instructions that, when executed by the at least one processor, cause the computing system to receive information indicating a zone scene comprising a predefined grouping of one or more playback devices of the media playback system that are to be configured for playback of the upcoming live media event when the zone scene is invoked; and wherein the program instructions that, when executed by at least one processor, cause the computing system to cause at least one of the one or more playback devices to use the identifier to access the live media stream from the media source comprise program instructions that, when executed by the at least one processor, cause the computing system to cause the zone scene to be invoked.

12. The non-transitory computer-readable medium of claim 11, wherein the zone scene comprises a predefined grouping of two or more playback devices that are to be configured for synchronous playback of the upcoming live media event when the zone scene is invoked, and wherein the program instructions that, when executed by the at least one processor, cause the computing system to cause the zone scene to be invoked comprise program instructions that, when executed by the at least one processor, cause the computing system to:

cause the zone scene to be invoked such that the two or more playback devices play back the live media event in synchrony at the start time of the live media event.

13. The non-transitory computer-readable medium of claim 11, wherein the program instructions that, when executed by the at least one processor, cause the computing system to cause the zone scene to be invoked comprise program instructions that, when executed by the at least one processor, cause the computing system to:

cause the zone scene to be invoked such that at least one of the one or more playback devices accesses the live media stream from the media source at a predefined time offset before the future start time.

14. The non-transitory computer-readable medium of claim 11, wherein the one or more playback devices are playing back media content when the zone scene is invoked, and wherein the program instructions that, when executed by the at least one processor, cause the computing system to cause the zone scene to be invoked comprise program instructions that, when executed by the at least one processor, cause the computing system to:

cause the zone scene to be invoked such that the one or more playback devices cease playback of the media content.

15. The non-transitory computer-readable medium of claim 11, wherein the program instructions that, when executed by the at least one processor, cause the computing system to cause the zone scene to be invoked comprise program instructions that, when executed by the at least one processor, cause the computing system to:

cause the computing device to invoke the zone scene and thereby initiate playback of the live media stream by the one or more playback devices.

16. The non-transitory computer-readable medium of claim 9, wherein the non-transitory computer-readable medium is also provisioned with program instructions that, when executed by the at least one processor, cause the computing system to:

determine a media consumption history of a user account associated with the computing device; and select the upcoming live media event from among a plurality of upcoming live media events based on the determined media consumption history.

17. A method implemented by a computing system, the method comprising:

determining (i) a future start time of an upcoming live media event and (ii) an identifier of a media source from which a live media stream of the live media event will be accessible at the future start time;

transmitting, to a computing device of a media playback system, information comprising a selectable notification identifying the live media event for display via a user interface of the computing device;

receiving, from the computing device, information indicating (i) a first selection of the notification and (ii) a second selection of one or more playback devices of the media playback system; and based on the information indicating the first and second selections, causing, at the start time of the live media event, at least one of the one or more playback devices to use the identifier to access the live media stream from the media source for synchronous playback by the one or more playback devices.

18. The method of claim 17, further comprising:

storing information indicating (i) the future start time of the upcoming live media event and (ii) the one or more playback devices of the media playback system.

19. The method of claim 17, wherein:

receiving information indicating the second selection of one or more playback devices of the media playback system comprises receiving information indicating a zone scene comprising a predefined grouping of one or more playback devices of the media playback system that are to be configured for playback of the upcoming live media event when the zone scene is invoked; and causing at least one of the one or more playback devices to use the identifier to access the live media stream from the media source comprises causing the zone scene to be invoked.

20. The method of claim 19, wherein the zone scene comprises a predefined grouping of two or more playback devices that are to be configured for synchronous playback of the upcoming live media event when the zone scene is invoked, and wherein causing the zone scene to be invoked comprises causing the zone scene to be invoked such that the two or more playback devices play back the live media event in synchrony at the start time of the live media event.

* * * * *